US012334978B2

(12) United States Patent
Bar-Or Tillinger et al.

(10) Patent No.: US 12,334,978 B2
(45) Date of Patent: Jun. 17, 2025

(54) FEEDBACK MECHANISM FOR A LASER BASED OPTICAL WIRELESS COMMUNICATIONS SYSTEM

(71) Applicant: QUALCOMM Incorporated, San Diego, CA (US)

(72) Inventors: Amit Bar-Or Tillinger, Tel-Aviv (IL); Yehonatan Dallal, Kfar Saba (IL); Shay Landis, Hod Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 18/046,380

(22) Filed: Oct. 13, 2022

(65) Prior Publication Data

US 2024/0129030 A1  Apr. 18, 2024

(51) Int. Cl.
*H04B 10/11* (2013.01)
*H04B 10/40* (2013.01)
*H04B 10/50* (2013.01)
*H04B 10/60* (2013.01)

(52) U.S. Cl.
CPC .............. *H04B 10/11* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| 6,690,719 | B1* | 2/2004 | Raphaeli | H04L 1/0061 375/220 |
| 2002/0131105 | A1* | 9/2002 | Herrity | H04B 10/2513 398/154 |
| 2003/0063353 | A1* | 4/2003 | Hamoir | H04B 10/541 398/183 |
| 2007/0127928 | A1* | 6/2007 | Varshneya | H04B 10/2587 398/135 |
| 2010/0061725 | A1* | 3/2010 | Jiang | H04J 3/1658 398/45 |
| 2010/0322177 | A1* | 12/2010 | Luo | H04L 1/189 370/329 |
| 2013/0179746 | A1* | 7/2013 | Hamada | H04L 25/4908 714/748 |
| 2016/0261307 | A1* | 9/2016 | Hameau | H04B 1/7183 |

FOREIGN PATENT DOCUMENTS

WO  WO-2019153253 A1 *  8/2019 ............. H04B 10/50

* cited by examiner

*Primary Examiner* — Darren E Wolf
(74) *Attorney, Agent, or Firm* — Holland & Hart LLP

(57) ABSTRACT

Methods, systems, and devices for wireless communications are described. The method may include a user equipment (UE) monitoring a set of time resources for a set of code blocks and receiving, from a network entity, a code block of the set of code blocks via an optical beam. Further, the method may include the UE modulating the optical beam based on receiving the code block and sending, to the network entity, the modulated optical beam including feedback associated with at least one code block of the set of code blocks.

26 Claims, 17 Drawing Sheets

FEEDBACK MECHANISM FOR A LASER BASED OPTICAL WIRELESS COMMUNICATIONS SYSTEM

FIELD OF TECHNOLOGY

The following relates to wireless communications, including feedback mechanism for a laser based optical wireless communications (OWC) system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a wireless communications system may support extended reality (XR). In XR, a network entity may transmit a series of code blocks to an XR device (e.g., a UE). In some examples, there may be timing gaps between code blocks of the series of code blocks. During these timing gaps, the XR device may transmit feedback signaling to the network entity indicating whether a code block of the series of code blocks was decoded successfully.

SUMMARY

The described techniques relate to improved methods, systems, devices, and apparatuses that support feedback mechanism for a laser based optical wireless communications (OWC) system. For example, the described techniques provide for a wireless device (e.g., a user equipment (UE)) to report feedback for one or more received code blocks using a modulated retro reflector (MRR). In some examples, the wireless device may monitor a set of time resources for a set of code blocks and receive, from a network entity, a code block of the set of code blocks via an optical beam. The wireless device may modulate the optical beam (e.g., using the MRR) and send, to the network entity, the modulated optical beam including feedback associated with at least one code block of the set of code blocks. Such techniques may enable a wireless device to send feedback for at least one code block of a set of code blocks during a same time duration as receiving the set of code blocks, which may reduce latency in the OWC system.

A method for wireless communication at a wireless device is described. The method may include monitoring a set of time resources for a set of multiple code blocks, receiving, from a network entity and based on monitoring for the set of multiple code blocks, a code block of the set of multiple code blocks via an optical beam, modulating the optical beam based on receiving the code block, and sending, to the network entity, the modulated optical beam including feedback associated with at least one code block of the set of multiple code blocks.

An apparatus for wireless communication at a wireless device is described. The apparatus may include a processor, memory coupled with the processor, and instructions stored in the memory. The instructions may be executable by the processor to cause the apparatus to monitor a set of time resources for a set of multiple code blocks, receive, from a network entity and based on monitoring for the set of multiple code blocks, a code block of the set of multiple code blocks via an optical beam, modulate the optical beam based on receiving the code block, and send, to the network entity, the modulated optical beam including feedback associated with at least one code block of the set of multiple code blocks.

Another apparatus for wireless communication at a wireless device is described. The apparatus may include means for monitoring a set of time resources for a set of multiple code blocks, means for receiving, from a network entity and based on monitoring for the set of multiple code blocks, a code block of the set of multiple code blocks via an optical beam, means for modulating the optical beam based on receiving the code block, and means for sending, to the network entity, the modulated optical beam including feedback associated with at least one code block of the set of multiple code blocks.

A non-transitory computer-readable medium storing code for wireless communication at a wireless device is described. The code may include instructions executable by a processor to monitor a set of time resources for a set of multiple code blocks, receive, from a network entity and based on monitoring for the set of multiple code blocks, a code block of the set of multiple code blocks via an optical beam, modulate the optical beam based on receiving the code block, and send, to the network entity, the modulated optical beam including feedback associated with at least one code block of the set of multiple code blocks.

Some examples of the method, apparatuses, and non-transitory computer-readable medium described herein may further include operations, features, means, or instructions for receiving control signaling indicating a threshold number of code blocks, where the feedback may be based on the threshold number of code blocks.

Some examples of the method, apparatuses, and non-transitory computer-readable medium described herein may further include operations, features, means, or instructions for receiving control signaling indicating a periodicity, where sending the modulated optical beam may be based on the periodicity.

Some examples of the method, apparatuses, and non-transitory computer-readable medium described herein may further include operations, features, means, or instructions for receiving control signaling indicating a sequence length of a synchronization signal, where sending the modulated optical beam may be based on the sequence length.

In some examples of the method, apparatuses, and non-transitory computer-readable medium described herein, sending the modulated optical beam may include operations, features, means, or instructions for sending a synchronization signal, where the modulated optical beam includes the synchronization signal.

Some examples of the method, apparatuses, and non-transitory computer-readable medium described herein may further include operations, features, means, or instructions for receiving, prior to receiving the code block, a second code block of the set of multiple code blocks via the optical beam, where the feedback may be associated with the second code block.

Some examples of the method, apparatuses, and non-transitory computer-readable medium described herein may further include operations, features, means, or instructions for identifying an error associated with decoding the second code block, where transmitting the feedback may be based on identifying the error and receiving, after receiving the code block, a retransmission of the second code block based on sending the modulated optical beam including the feedback associated with the second code block.

Some examples of the method, apparatuses, and non-transitory computer-readable medium described herein may further include operations, features, means, or instructions for receiving, prior to receiving the second code block, a third code block of the set of multiple code blocks via the optical beam, where the feedback may be associated with the second code block and the third code block.

Some examples of the method, apparatuses, and non-transitory computer-readable medium described herein may further include operations, features, means, or instructions for detecting an error associated with decoding one or both of the second code block or the third code block, where transmitting the feedback may be based on detecting the error.

Some examples of the method, apparatuses, and non-transitory computer-readable medium described herein may further include operations, features, means, or instructions for decoding the code block without error, receiving, after receiving the code block, a second code block via the optical beam, and refraining from sending a second modulated optical beam including feedback associated with the code block based on decoding the code block without error.

Some examples of the method, apparatuses, and non-transitory computer-readable medium described herein may further include operations, features, means, or instructions for receiving, from the network entity and after receiving the code block, a pilot signal via a second optical beam, modulating the second optical beam based on receiving the pilot signal, and sending, to the network entity, the modulated second optical beam including feedback associated with the code block of the set of multiple code blocks.

In some examples of the method, apparatuses, and non-transitory computer-readable medium described herein, the wireless device includes a modulated retro reflector (MRR).

In some examples of the method, apparatuses, and non-transitory computer-readable medium described herein, the feedback associated with the at least one code block of the set of multiple code blocks includes acknowledgement (ACK) feedback or negative acknowledgement (NACK) feedback for the at least one code block of the set of multiple code blocks.

A method for wireless communication at a network entity is described. The method may include transmitting, via a set of time resources, a code block of a set of multiple code blocks via an optical beam and receiving, based on transmitting the code block, a modulated optical beam including feedback associated with at least one code block of the set of multiple code blocks.

An apparatus for wireless communication at a network entity is described. The apparatus may include a processor, memory coupled with the processor, and instructions stored in the memory. The instructions may be executable by the processor to cause the apparatus to transmit, via a set of time resources, a code block of a set of multiple code blocks via an optical beam and receive, based on transmitting the code block, a modulated optical beam including feedback associated with at least one code block of the set of multiple code blocks.

Another apparatus for wireless communication at a network entity is described. The apparatus may include means for transmitting, via a set of time resources, a code block of a set of multiple code blocks via an optical beam and means for receiving, based on transmitting the code block, a modulated optical beam including feedback associated with at least one code block of the set of multiple code blocks.

A non-transitory computer-readable medium storing code for wireless communication at a network entity is described. The code may include instructions executable by a processor to transmit, via a set of time resources, a code block of a set of multiple code blocks via an optical beam and receive, based on transmitting the code block, a modulated optical beam including feedback associated with at least one code block of the set of multiple code blocks.

Some examples of the method, apparatuses, and non-transitory computer-readable medium described herein may further include operations, features, means, or instructions for transmitting control signaling indicating a threshold number of code blocks, where the feedback may be based on the threshold number of code blocks.

Some examples of the method, apparatuses, and non-transitory computer-readable medium described herein may further include operations, features, means, or instructions for transmitting control signaling indicating a periodicity, where receiving the modulated optical beam may be based on the periodicity.

Some examples of the method, apparatuses, and non-transitory computer-readable medium described herein may further include operations, features, means, or instructions for transmitting control signaling indicating a sequence length of a synchronization signal, where receiving the modulated optical beam may be based on the sequence length.

In some examples of the method, apparatuses, and non-transitory computer-readable medium described herein, receiving the modulated optical beam may include operations, features, means, or instructions for receiving a synchronization signal, where the modulated optical beam includes the synchronization signal.

Some examples of the method, apparatuses, and non-transitory computer-readable medium described herein may further include operations, features, means, or instructions for transmitting, prior to transmitting the code block, a second code block of the set of multiple code blocks via the optical beam, where the feedback may be associated with the second code block.

Some examples of the method, apparatuses, and non-transitory computer-readable medium described herein may further include operations, features, means, or instructions for transmitting, prior to transmitting the second code block, a third code block of the set of multiple code blocks via the optical beam, where the feedback may be associated with the second code block.

Some examples of the method, apparatuses, and non-transitory computer-readable medium described herein may further include operations, features, means, or instructions for transmitting, after transmitting the code block, a pilot signal via a second optical beam and receiving a modulated second optical beam including feedback associated with the code block of the set of multiple code blocks.

In some examples of the method, apparatuses, and non-transitory computer-readable medium described herein, the feedback associated with the at least one code block of the set of multiple code blocks includes ACK feedback or NACK feedback for the at least one code block of the set of multiple code blocks.

DETAILED DESCRIPTION

Figure 1:
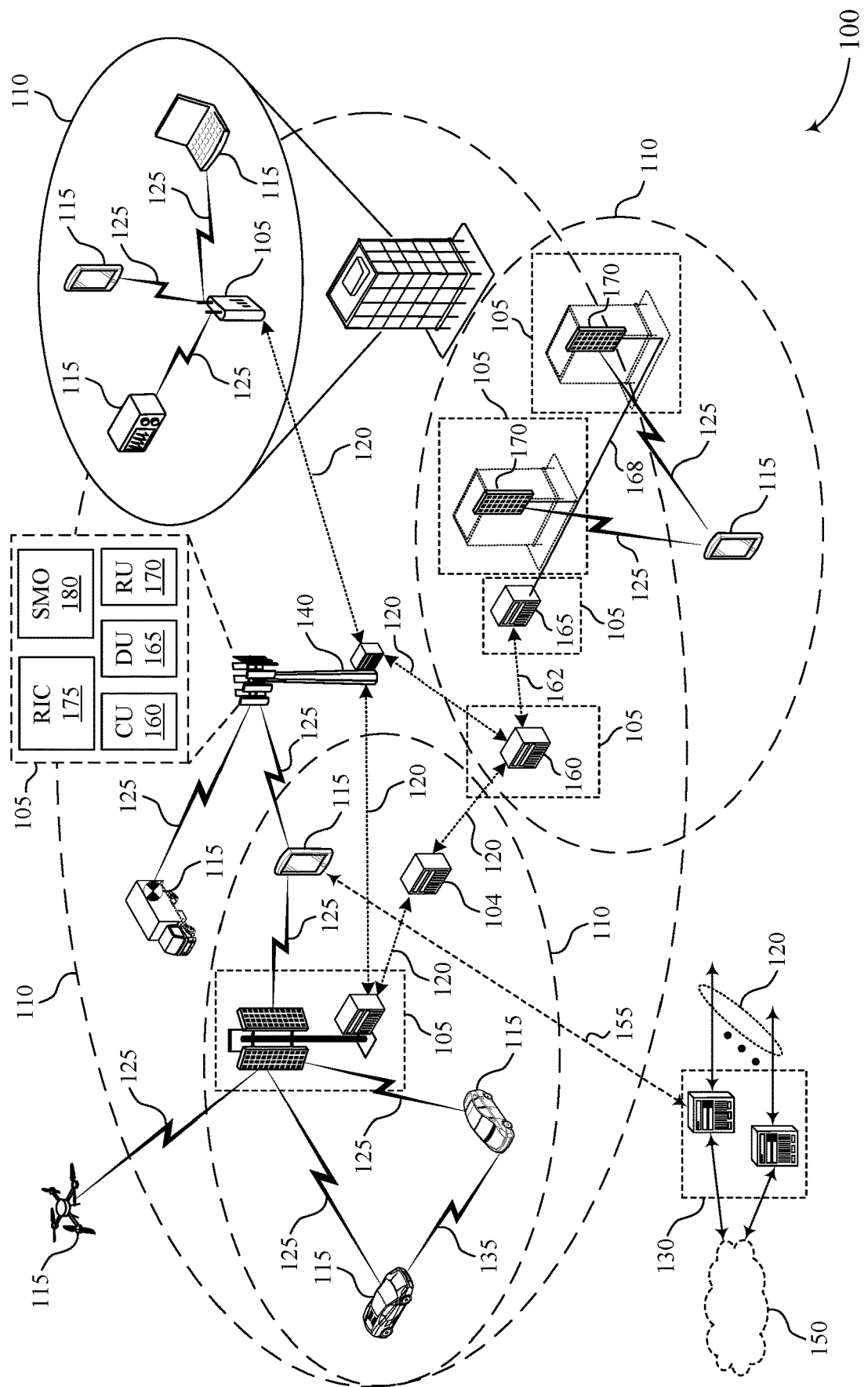
FIGS. 1 and 2 illustrate examples of a wireless communications system that supports feedback mechanism for a laser based optical wireless communications (OWC) system in accordance with one or more aspects of the present disclosure.

In some examples, a wireless communications system may support extended reality (XR). XR may include augmented reality (AR), mixed reality (MR), or virtual reality (VR). To support XR, the wireless communications system may utilize optical wireless communications (OWC). That is, an XR device (e.g., XR goggles, glasses, or headset) may communicate with other wireless devices using light or optical beams. To generate and modulate information using optical beams, the XR device may include an optical beam transmitter. In one example, a network entity may transmit, to an XR device, a series of code blocks using an optical beam. Between each of the code blocks of the series of code blocks there may be a timing gap and during those timing gaps, the XR device may transmit, to the network entity, feedback information (e.g., acknowledgement (ACK) or negative acknowledgement (NACK)) for at least one code block of the series of code blocks using an optical beam (e.g., generated using the optical beam transmitter). However, transmitting feedback information in this manner may increase latency. Further, including the optical beam transmitter in the XR device may increase power consumption at the XR device and increase a manufacturing cost of the XR device.

As described herein, an XR device (e.g., a user equipment (UE)) may include a modulated retro reflector (MRR) and utilize the MRR to send feedback information for at least one code block of a series of code blocks to a network entity. In one example, the XR device may monitor for multiple code blocks and receive a code block of the multiple code blocks from a network entity via an optical beam. The XR device may modulate the optical beam and send (or reflect) the modulated optical beam to the network entity using the MRR. The modulated optical beam may include feedback information associated with at least one code block of the multiple code blocks (e.g., one or more code blocks received prior to the reception of multiple code blocks). In some examples, the feedback information may be associated with multiple code blocks (e.g., aggregated feedback). In such case, the UE may receive a control signal indicating a maximum number of code blocks and modulate the optical beam to include feedback information for the maximum number of code blocks. Additionally, the UE may receive a control signal indicating a periodicity for the feedback. In such example, the UE may send feedback information associated with one or more code blocks of the multiple code blocks during each periodic occasion (e.g., during a periodic occasion that occurs after receiving the one or more code blocks). Using the techniques herein may enable an XR device to send feedback information without an optical beam transmitter which may reduce manufacturing costs and power consumption. In addition, the techniques described herein may reduce latency because the XR device sends feedback information during a same duration that the multiple code blocks is being received by the XR device.

Aspects of the disclosure are initially described in the context of wireless communications systems. Additional aspects are described in the context of feedback schemes and a process flow. Aspects of the disclosure are further illustrated by and described with reference to apparatus diagrams, system diagrams, and flowcharts that relate to feedback mechanism for a laser based OWC system.

FIG. 1 illustrates an example of a wireless communications system 100 that supports feedback mechanism for a laser based OWC system in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support feedback mechanism for a laser based OWC system as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/$ ($\Delta f_{max} \cdot N_f$) seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC)

or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may be an XR system or may support XR communications, and the UE 115 may be an example of an XR device (e.g., XR goggle, XR headset, XR glasses). As described herein, the UE 115 may include an MRR or component that has MRR functionality and utilize the MRR to send feedback for one or more received code blocks to a network entity 105. In some examples, the UE 115 may monitor a set of time resources for a set of code blocks and receive, from the network entity 105, a code block of the set of code blocks via an optical beam. The UE 115 may modulate the optical beam (e.g., using the MRR) and send, to the network entity 105, the modulated optical beam including feedback associated with at least one code block of the set of code blocks. The methods as described herein may allow the UE 115 to send feedback for at least one code block of a set of code blocks during a same time duration as receiving the set of code blocks which may reduce latency when compared to transmitting feedback for a code block of the set of code blocks during a timing gap between code blocks of the set of code blocks.

Figure 2:
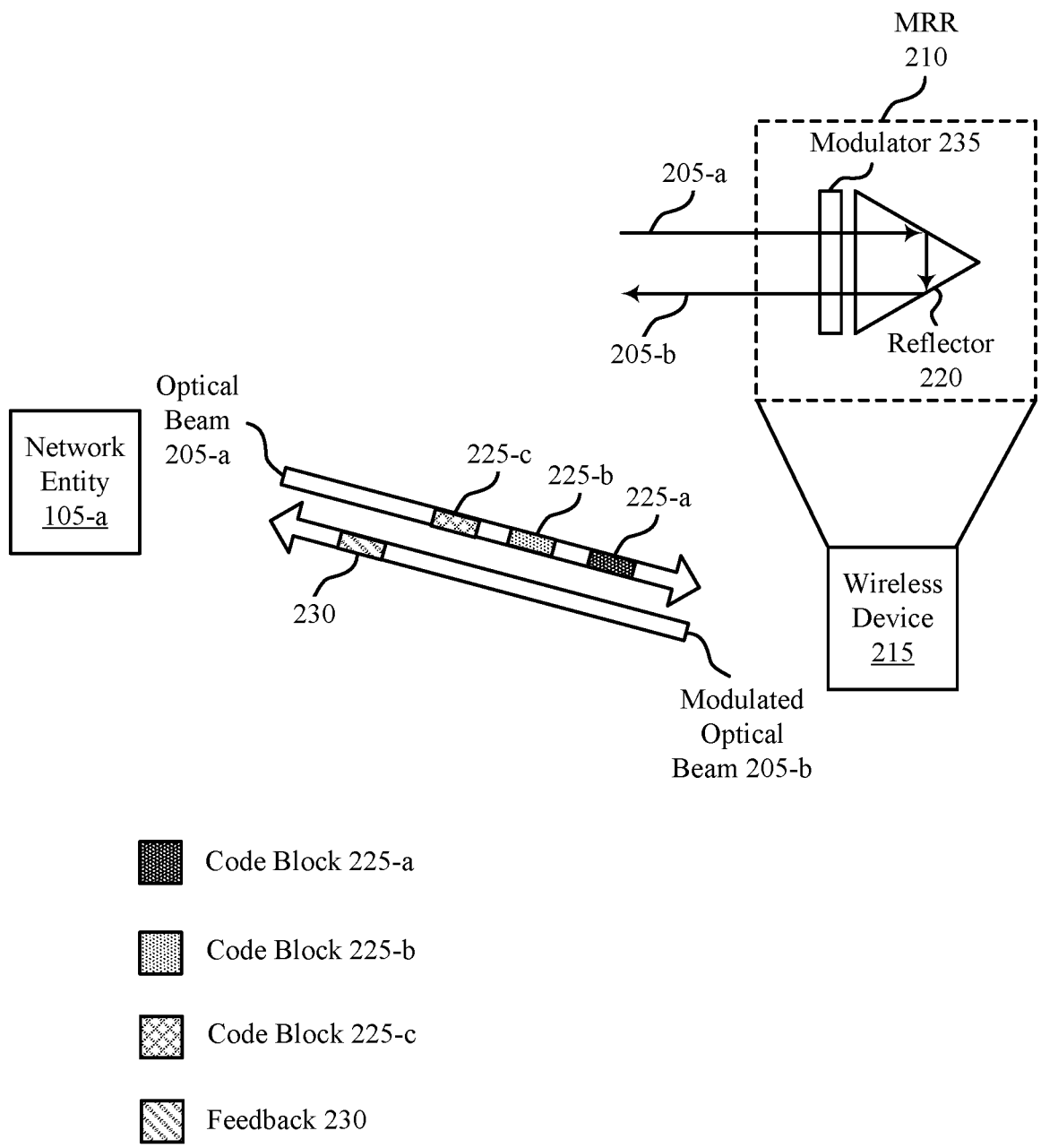

FIG. 2 illustrates an example of a wireless communications system 200 that supports feedback mechanism for a laser based OWC system in accordance with one or more aspects of the present disclosure. In some examples, the wireless communications system 200 may support aspects of a wireless communications system 100. For example, the wireless communications system 200 may include a network entity 105-a which may be an example of a network entity 105 as described with reference to FIG. 1. Further, the wireless communications system 200 may include a wireless device 215 which may be an example of a UE 115 as described with reference to FIG. 1.

In some examples, the wireless communications system 200 may support XR. XR may encompass VR, AR, MR, or other reality environments. In VR, a user may be immersed in a completely virtual environment. In AR, a user's physical surroundings may be added to or augmented using digital elements. Further, MR may be a combination of both VR and AR. In some examples, to support XR, the wireless device 215 may be an example of an XR device. XR devices may be described as head-worn devices that allow a user to experience the VR or AR. For example, XR devices may include headsets, goggles, glasses, and the like. XR devices may be used for gaming, computer aided design (CAD), holographic conferencing, etc.

In some examples, XR communications may have relatively strict latency targets. These targets may be due to an XR device's reliance on its current location or position information. In XR, the network entity 105-a may transmit a series of code blocks 225 to the wireless device 215. In some examples, the series of code blocks 225 may collectivity make up a video frame. Between each code block 225 there may be a gap in time. During the gap in time, the wireless device 215 may transmit feedback related to a previously received code block 225 to the network entity 105-a. As one example, the wireless device 215 may receive a first code block 225 followed by a second code block 225 followed by third code block 225 from the network entity 105-a. The wireless device 215 may attempt to decode the first code block 225 (e.g., while receiving the second code block 225) and transmit feedback related to the first code block 225 during a gap between receiving the second code block 225 and receiving the third code block 225.

The feedback may include ACK feedback or NACK feedback. ACK feedback may indicate that the corresponding code block 225 was decoded by the wireless device 215 successfully. Alternatively, NACK feedback may indicate the corresponding code block 225 was decoded by the wireless device 215 unsuccessfully. In the event of NACK feedback, the network entity 105-a may retransmit the corresponding code block 225 to the wireless device 215. However, using such a feedback mechanism may increase latency for XR communications. For example, the wireless device 215 may not receive a next code block 225 until after a gap in time during which the wireless device 215 is expected to transmit feedback for previously received code block 225 resulting in a delay related to receiving code blocks 225 from the network entity 105-a.

In some examples, the wireless communications system 200 may support OWC. In such example, the network entity 105-a and the wireless device 215 may communicate with one another using optical beams 205. An optical beam 205 may be described as unguided visible, infrared (IR), or ultraviolet (UV) light. As such, the network entity 105-a and the wireless device 215 may include a modulator to encode data on the optical beam 205 and a transmitter capable of transmitting the optical beam 205. The network entity 105-a may transmit a code block 225 of the series of code blocks 225 using an optical beam 205 and the wireless device 215 may transmit feedback for the code block 225 (e.g., during the gaps between code blocks 225) using an optical beam 205. However, in some examples, manufacturing the wireless device 215 with one or more both of the modulator and the transmitter may be costly and utilizing the modulator and the transmitter may increase power consumption at the wireless device 215.

As described herein, the wireless device 215 may include an MRR 210. An MRR 210 may allow the wireless device 215 to reflect and modulate received optical beams 205 (e.g., at a high bandwidth). The MRR 210 may include a modulator 235 and a reflector 220. There may be many different types of modulators 235 such as deformable micro-electro-mechanical systems (MEMs), liquid crystals, electro-optic phase modulators, and multiple quantum wells (MQW). Further, there may be many different types of reflectors 220 such as corner cube or cat's eye. The wireless device 215 may receive an optical beam 205 from the network entity 105-a and change the direction of the optical beam 205 using the reflector 220 (e.g., reflect the optical beam 205 in a same or similar direction in which it was received). The reflected optical beam 205 (e.g., an optical beam 205-a) may pass through the modulator 235 and the modulated optical beam 205 (e.g., the modulated optical beam 205-b) may continue in the direction dictated by the reflector 220.

As described herein, the wireless device 215 may utilize an MRR 210 to send feedback to the network entity 105-a. In one example, the wireless device 215 may send feedback for each code block 225 of a series of code blocks 225 received from the network entity 105-a. For example, the wireless device 215 may receive a code block 225-b during a first time duration and a code block 225-c during a second time duration that is after the first time duration using the optical beam 205-a. During the second time duration, the wireless device 215 may attempt to decode the code block 225-b and generate feedback for the code block 225-b (e.g., ACK feedback or NACK feedback). Further, during the second time duration, the wireless device 215 may utilize the modulator 235 to encode the optical beam 205-a with the feedback 230 creating a modulated optical beam 205-b and send the feedback 230 to the network entity 105-a via the modulated optical beam 205-b using the reflector 220. The network entity 105-a may receive the modulated optical beam 205-b and decode the feedback 230. If the feedback 230 includes NACK feedback, the network entity 105-a may retransmit the code block 225-b to the wireless device 215.

In another example, the wireless device 215 may send feedback for a group of code blocks 225 of the series of code blocks 225 received from the network entity 105-a (e.g., aggregated feedback). For example, the wireless device 215 may receive a code block 225-a during a first time duration, a code block 225-*b* during a second time duration that is after the first time duration, and a code block 225-*c* during a third time duration that is after the second time duration using an optical beam 205-*a*. During the second time duration, the wireless device 215 may attempt to decode the code block 225-*a* and generate feedback 230 for the code block 225-*a* (e.g., ACK feedback or NACK feedback). During the third time duration, the wireless device 215 may attempt to decode the code block 225-*b* and generate feedback 230 for the code block 225-*b*. Further, during the third time duration, the wireless device 215 may utilize the modulator 235 to encode the optical beam 205-*a* with the feedback 230 associated with code block 225-*a* and the code block 225-*b* creating a modulated optical beam 205-*b* and send the feedback 230 to the network entity 105-*a* via the modulated optical beam 205-*b* using the reflector 220. The network entity 105-*a* may receive the modulated optical beam 205-*b* and decode the feedback 230. If the feedback 230 includes NACK feedback, the network entity 105-*a* may retransmit the code block 225-*a*, the code block 225-*b*, or both to the wireless device 215.

In some examples, prior to receiving the series of code blocks 225, the wireless device 215 may receive control signaling indicating a threshold number of code blocks 225. The threshold number of code blocks 225 may correspond to a number of consecutive code blocks 225 for which the wireless device 215 may include feedback information for in the feedback 230. As one example, the threshold number of code blocks may be two. In such example, the feedback 230 may include feedback information related to a first code block 225 (e.g., the code block 225-*b*) and a second code block 225 (e.g., the code block 225-*c*).

In some examples, the wireless device 215 may send the feedback 230 according to a periodicity. The periodicity may indicate a time duration between each feedback opportunity. If the wireless device 215 has feedback 230 to send (e.g., for a single code block 225 or multiple code blocks 225), the wireless device 215 may send the feedback 230 during the next feedback opportunity. In some examples, the network entity 105-*a* may transmit control signaling to the wireless device 215 indicating the periodicity. Alternatively, the wireless device 215 may send the feedback 230 in an asynchronized manner. In such example, as soon as the wireless device 215 has feedback 230, the wireless device 215 may send the feedback 230 to the network entity 105-*a*. In some examples, the network entity 105-*a* may transmit a pilot signal after the series of code blocks 225 to ensure that the wireless device 215 is able to send feedback for the last code block 225 of the series. For example, the network entity 105-*a* may transmit the pilot signal using the optical beam 205-*a* after the code block 225-*c* such that the wireless device 215 may utilize the optical beam 205-*a* to send feedback 230 for the code block 225-*c*. Additionally, the feedback 230 may include a synchronization signal (e.g., at the beginning of the message and prior to the encoded payload). In such example, the network entity 105-*a* may transmit control signaling to the wireless device 215 indicating a sequence length for the synchronization signal. The method as described herein may reduce power consumption at the wireless device 215 and reduce manufacturing costs of the wireless device 215 because the wireless device 215 does not utilize an optical beam transmitter configured to transmit feedback 230 but instead utilizes an MRR 210 to send feedback. Additionally, the methods as described herein may reduce latency related to reporting feedback for received code blocks 225 because the wireless device 215 may potentially send feedback 230 while receiving a code block 225 as opposed to transmitting feedback 230 during gaps between receiving each code block 225.

Figure 3:
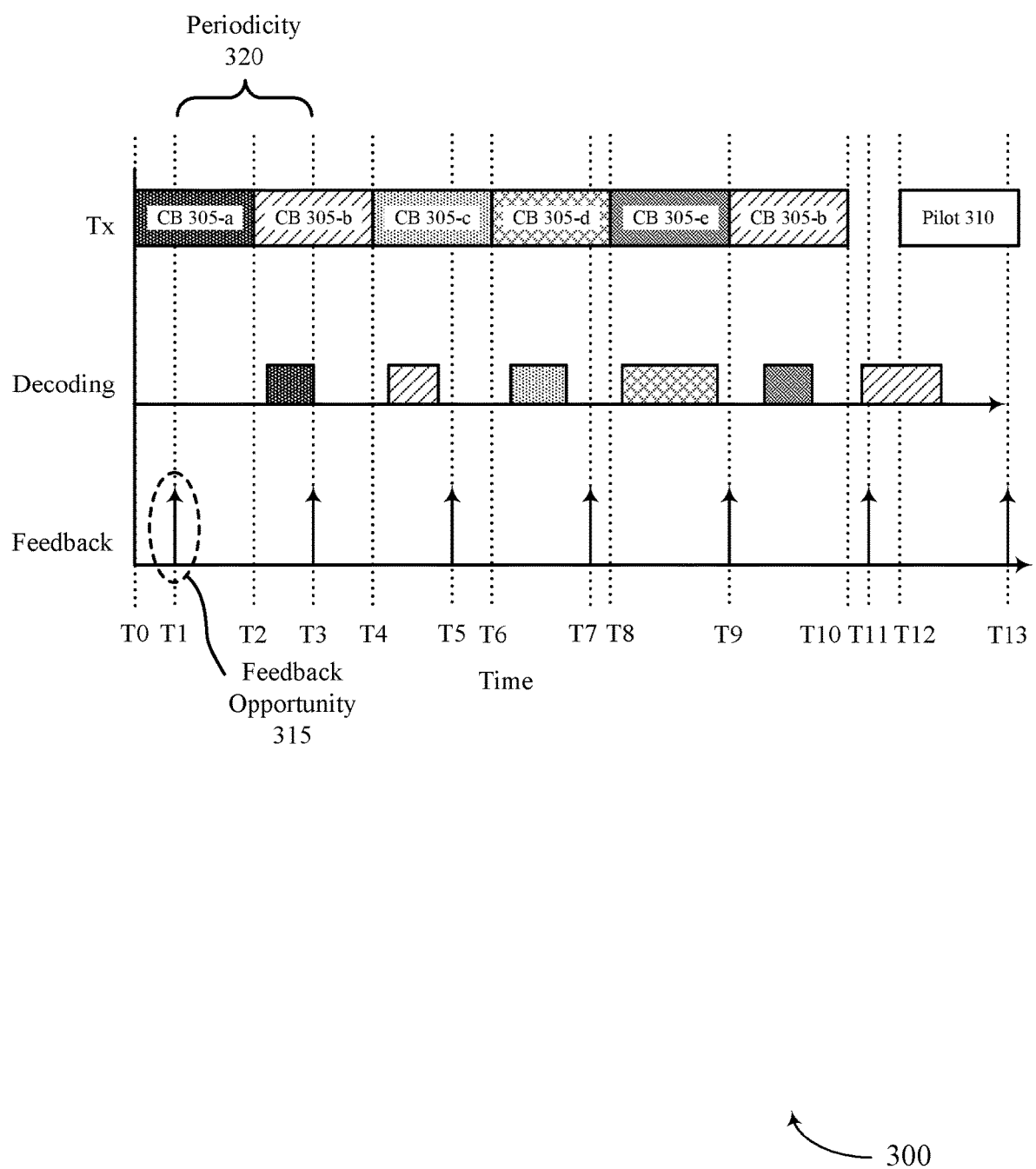
FIGS. 3 and 4 illustrate examples of a feedback scheme that supports feedback mechanism for a laser based OWC system in accordance with one or more aspects of the present disclosure.

FIG. 3 illustrates an example of a feedback scheme 300 that supports feedback mechanism for a laser based OWC system in accordance with one or more aspects of the present disclosure. In some examples, the feedback scheme 300 may be implemented by aspects of a wireless communications system 100 and a wireless communications system 200. For example, the feedback scheme 300 may be implemented by a UE 115 or a network entity 105 as described with reference to FIG. 1. Further, the feedback scheme 300 may be implemented by a wireless device 215 or a network entity 105-*a* as described with reference to FIG. 2.

As described with reference to FIG. 2, a wireless device may utilize a modulator component and a reflector component (e.g., collectively known as an MRR) to send feedback to a network entity for a previously received code block 305. Additionally, as described with reference to FIG. 2, the wireless device may send the feedback to the network entity in a synchronized or periodic manner. In such examples, the wireless device may receive control signaling from the network entity indicating a periodicity 320 for the feedback. The periodicity 320 may be a time duration between each feedback opportunity 315. As shown in FIG. 3, a feedback opportunity 315 may occur at T1, T3, T5, T7, T9, T11, and T13. During each feedback opportunity 315, the wireless device may potentially send feedback to the network entity (e.g., using a reflected optical beam).

In some examples, the wireless device may send feedback for each received code block 305. As shown in FIG. 3, the wireless device may receive a series of code blocks 305. In one example, the series of code blocks may include a code block 305-*a*, a code block 305-*b*, a code block 305-*c*, a code block 305-*d*, and a code block 305-*e*. In some examples, the wireless device may receive the code blocks 305 in the following order: the code block 305-*a* followed by a code block 305-*b* followed by a code block 305-*c* followed by a code block 305-*d* followed by the code block 305-*e*. At T0, the wireless device may receive the code block 305-*a* from the network entity and at T2, the wireless device may receive the code block 305-*b* from the network entity using an optical beam. After T2, the wireless device may attempt to decode the code block 305-*a* and during the feedback opportunity 315 at T3, the wireless device may modulate the optical beam to include feedback information associated with the code block 305-*a* and send the modulated optical beam to the network entity. Further, at T4, the wireless device may receive a code block 305-*c* from the network entity using the optical beam. After T4, the wireless device may attempt to decode the code block 305-*b* and during the feedback opportunity 315 at T5, the wireless device may modulate the optical beam to include feedback information associated with the code block 305-*b* and send the modulated optical beam to the network entity.

Alternatively, the wireless device may send feedback for a group of code blocks 305. In such example, the wireless device may receive control signaling from the network entity indicating a number of code blocks 305 to include feedback for in a single feedback message (e.g., single uplink control information (UCI)). In one example, the number of code blocks 305 may be equal to three code blocks. At T0, the wireless device may receive a code block 305-*a*, at T2, the wireless device may receive a code block 305-*b*, at T4, the wireless device may receive a code block 305-*c*, and at T6, the wireless device may receive a code block 305-*d* using the optical beam. The wireless device may attempt to decode the code block 305-*a*, the code block 305-*b*, and the code block 305-*c* and send the feedback for the code block 305-*a*, the code block 305-*b*, and the code block 305-*c* in a feedback opportunity 315 that occurs after attempting to decode the code block 305-*a*, the code block 305-*b*, and the code block 305-*c*. For example, at T7, the wireless device may modulate the optical beam to include the feedback and send the modulated optical beam to the network entity.

In some examples, the wireless device may unsuccessfully decode one or more of the code blocks 305. For example, the wireless device may unsuccessfully decode the code block 305-*b* and the feedback associated with the code block 305-*b* may be NACK feedback. In such example, the network entity may retransmit the code block 305-*b* to the wireless device. For example, in the case of aggregated feedback, the network entity may retransmit the code block 305-*b* starting at T9. In the case of single code block feedback, the network entity may retransmit the code block 305-*b* starting at T6 (not shown).

In some examples, the wireless device may send feedback for a code block 305 or a group of code blocks 305 if feedback associated with the code block 305 or at least one code block 305 of the group of code blocks 305 includes NACK feedback. For example, in the case of aggregated feedback, the wireless device may send feedback for the code block 305-*a*, the code block 305-*c*, and the code block 305-*c* at T7 if the wireless device unsuccessfully decodes one of the code block 305-*a*, the code block 305-*b*, or the code block 305-*c*. Alternatively, the wireless device may refrain from sending feedback for the code block 305-*a*, the code block 305-*b*, and the code block 305-*c* if the wireless device successfully decodes all of the code block 305-*a*, the code block 305-*b*, and the code block 305-*c*.

In some examples, the network entity may transmit a downlink signal to the network entity during times (e.g., slots) where feedback is expected from the wireless device. For example, the network entity may transmit a pilot signal 310 using a second optical beam to the wireless device at T12 such that the wireless device may modulate the second optical beam with feedback information associated with the code block 305-*b* (e.g., feedback determined based on decoding the code block 305-*b* after T10) and send the modulated second optical beam to the network entity at T13. That is, the network entity may ensure that the wireless device receives an optical beam during each feedback opportunity 315 such that the wireless device may utilize the optical beam to send feedback to the network entity. The downlink signals may be pilot signals 310, physical downlink shared channel (PDSCH) transmissions, physical downlink control channel (PDCCH) transmission, or any other downlink signals.

Figure 4:
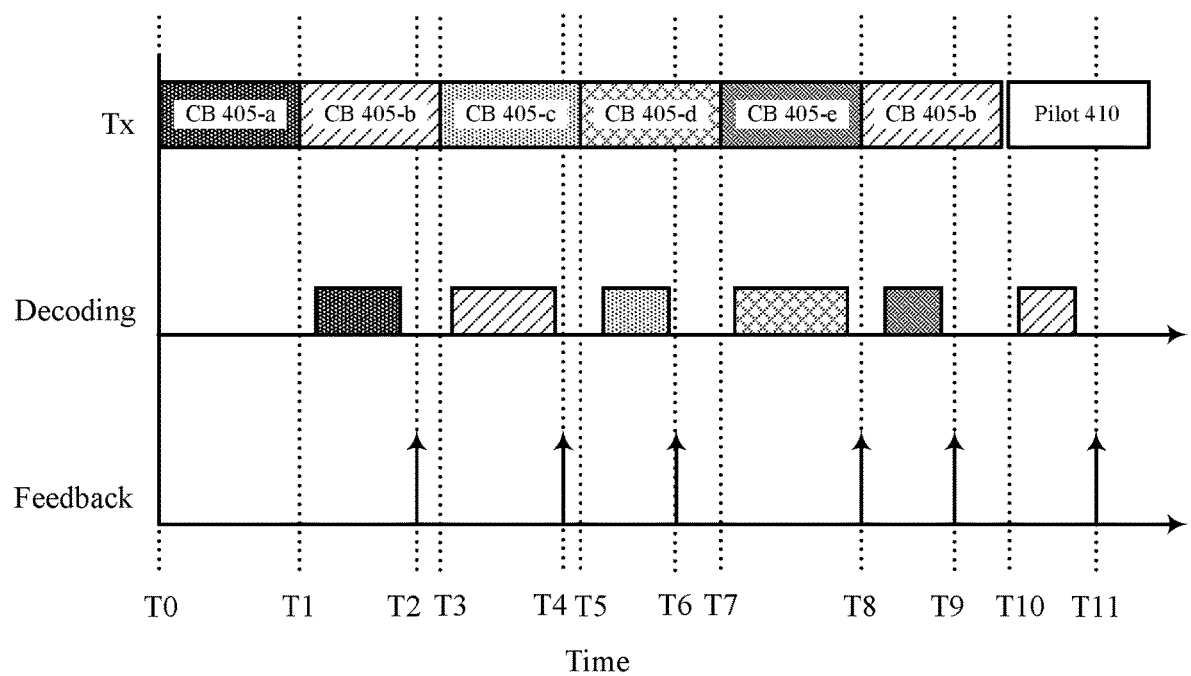

FIG. 4 illustrates an example of a feedback scheme 400 that supports feedback mechanism for a laser based OWC system in accordance with one or more aspects of the present disclosure. In some examples, the feedback scheme 400 may be implemented by aspects of a wireless communications system 100 and a wireless communications system 200. For example, the feedback scheme 400 may be implemented by a UE 115 or a network entity 105 as described with reference to FIG. 1. Further, the feedback scheme 400 may be implemented by a wireless device 215 or a network entity 105-*a* as described with reference to FIG. 2.

As described with reference to FIG. 2, a wireless device may utilize a modulator component and a reflector component (e.g., collectively known as an MRR) to send feedback to a network entity for a previously received code block 405. Additionally, as described with reference to FIG. 2, the wireless device may send the feedback to the network entity in a asynchronized or aperiodic manner. That is, a feedback transmission may occur at any time. For example, as shown in FIG. 4, a feedback transmission may potentially occur at T2, T4, T6, T8, T9, and T11.

In some examples, the wireless device may send feedback for each received code block 405. As shown in FIG. 4, the wireless device may receive a series of code blocks 405. In one example, the series of code blocks 405 may include a code block 405-*a*, a code block 405-*b*, a code block 405-*c*, a code block 405-*d*, and a code block 405-*e*. In some examples, the wireless device may receive the code blocks 405 in the following order: the code block 405-*a* followed by a code block 405-*b* followed by a code block 405-*c* followed by a code block 405-*d* followed by the code block 405-*e*. At T0, the wireless device may receive the code block 405-*a* from the network entity and at T1, the wireless device may receive the code block 405-*b* from the network entity using an optical beam. After T1, the wireless device may attempt to decode the code block 405-*a* and at T2, after attempting to decode the code block 405-*a*, the wireless device may modulate the optical beam to include feedback information associated with the code block 405-*a* and send the modulated optical beam to the network entity. Further, at T3, the wireless device may receive a code block 405-*c* from the network entity using the optical beam. After T3, the wireless device may attempt to decode the code block 405-*b* and at T4, after attempting to decode the code block 405-*b*, the wireless device may modulate the optical beam to include feedback information associated with the code block 405-*b* and send the modulated optical beam to the network entity.

Alternatively, the wireless device may send feedback for a group of code blocks 405. In such example, the wireless device may receive control signaling from the network entity indicating a number of code blocks 405 to include feedback for in a single feedback message (e.g., single UCI). In one example, the number of code blocks 405 may be equal to three code blocks. At T0, the wireless device may receive a code block 405-*a*, at T1, the wireless device may receive a code block 405-*b*, at T3, the wireless device may receive a code block 405-*c*, and at T5, the wireless device may receive a code block 405-*d* using the optical beam. The wireless device may attempt to decode the code block 405-*a*, the code block 405-*b*, and the code block 405-*c* and send the feedback for the code block 405-*a*, the code block 405-*b*, and the code block 405-*c* after attempting to decode the code block 405-*a*, the code block 405-*b*, and the code block 405-*c*. For example, at T6, the wireless device may modulate the optical beam to include the feedback and send the modulated optical beam to the network entity.

In some examples, the wireless device may unsuccessfully decode one or more of the code blocks 405. For example, the wireless device may unsuccessfully decode the code block 405-*b* and the feedback associated with the code block 405-*b* may be NACK feedback. In such example, the network entity may retransmit the code block 405-*b* to the wireless device. For example, in the case of aggregated feedback, the network entity may retransmit the code block 405-*b* starting at T8. In the case of single code block feedback, the network entity may retransmit the code block 405-*b* starting at T5 (not shown).

In some examples, the wireless device may send feedback for a code block 405 or a group of code blocks 405 if feedback associated with the code block 405 or at least one code block 405 of the group of code blocks 405 includes NACK feedback. For example, in the case of aggregated feedback, the wireless device may send feedback for the code block 405-*a*, the code block 405-*b*, and the code block 405-*c* at T6 if the wireless device unsuccessfully decodes one of the code block 405-*a*, the code block 405-*b*, or the code block 405-*c*. Alternatively, the wireless device may refrain from sending feedback for the code block 405-*a*, the code block 405-*b*, and the code block 405-*c* if the wireless device successfully decodes all of the code block 405-*a*, the code block 405-*b*, and the code block 405-*c*.

In some examples, the network entity may transmit a downlink signal to the network entity during times (e.g., slots) where feedback is expected from the wireless device. For example, the network entity may transmit a pilot signal 410 using a second optical beam to the wireless device at T10 such that the wireless device may modulate the second optical beam with feedback information associated with the code block 405-*b* and send the modulated second optical beam to the network entity at T11. That is, the network entity may ensure that the wireless device has an optical beam to utilize for sending feedback for each code block 405. The downlink signals may be pilot signals 410, PDSCH transmissions, PDCCH transmission, or any other downlink signals.

Figure 5:
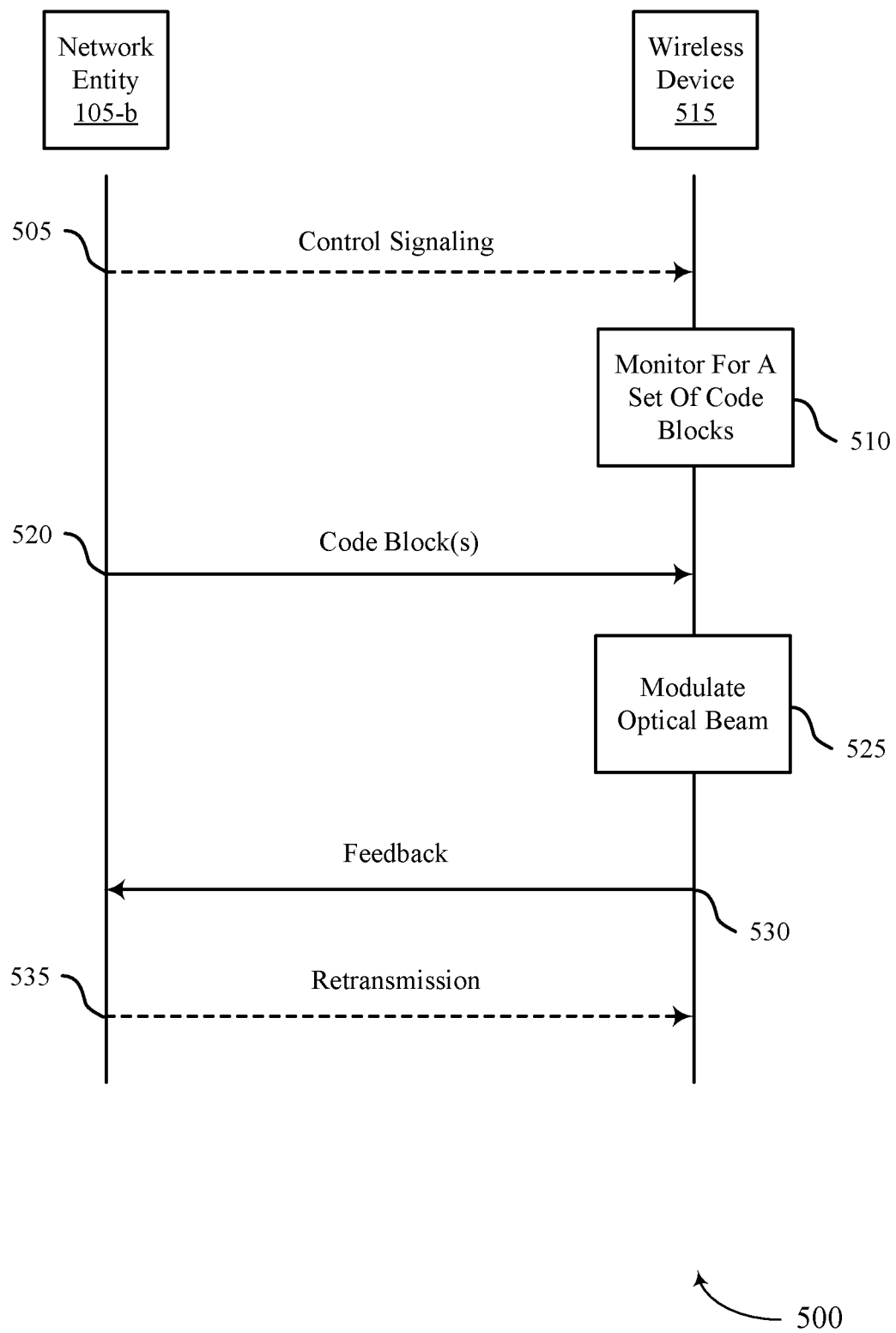
FIG. 5 illustrates an example of a process flow that supports feedback mechanism for a laser based OWC system in accordance with one or more aspects of the present disclosure.

FIG. 5 illustrates an example of a process flow 500 that supports feedback mechanism for a laser based OWC system in accordance with one or more aspects of the present disclosure. In some examples, the process flow 500 may be implemented by aspects of a wireless communications system 100 and a wireless communications system 200. For example, the process flow 500 may be implemented by a wireless device 515 or a network entity 105-*b* which may be examples of a UE 115 or a network entity 105 as described with reference to FIG. 1. Additionally, the wireless device 515 or the network entity 105-*b* may be examples of a wireless device 215 or a network entity 105-*b* as described with reference to FIG. 2. Alternative examples of the following be implemented, where some steps are performed in a different order than described or are not performed at all. In some cases, steps may include additional features not mentioned below, or further steps may be added.

At 505, the wireless device 515 may potentially receive control signaling from a network entity 105-*b*. In some examples, the control signaling may indicate a threshold number of code blocks for reporting feedback. For example, the control signaling may indicate to include feedback information for two code blocks in a single feedback message. Additionally or alternatively, the control signaling may indicate a periodicity associated with reporting feedback. Additionally or alternatively, the control signaling may indicate a sequence length for a synchronization signal.

At 510, the wireless device 515 may monitor a set of time resources for a set of code blocks. As one example, the set of code blocks may include a first code block, a second code block, and a third code block.

At 520, the wireless device 515 may receive, from the network entity 105-*b*, the first code block of the set of code blocks via an optical beam. Additionally, the wireless device 515 may receive, from the network entity 105-*b* and prior to receiving the first code block, a second code block of the set of code blocks via the optical beam. Additionally, the wireless device 515 may receive, from the network entity 105-*b* and prior to receiving the second code block, a third code block of the set of code blocks via the optical beam.

At 525, the wireless device 515 may modulate the optical beam during a same time duration as receiving the first code block. In some examples, wireless device 515 may modulate the optical beam using an MRR included in the wireless device 515. In one example, the modulated optical beam may include feedback associated with at least one code block of the set of code blocks received by the wireless device and the feedback may include NACK feedback or ACK feedback. If the wireless device supports single code block feedback (e.g., feedback transmission includes feedback for one code block), the feedback may be associated with the second code block. If the wireless device supports aggregated code block feedback (e.g., feedback transmission includes feedback for more than one code block), the feedback may be associated with the second code block and the third code block (and one or more additional code blocks if the number of code blocks indicated in the control signaling is greater than two).

At 530, the wireless device 515 may send (or reflect) the feedback using the modulated optical beam to the network entity 105-*b*. In some examples, wireless device 515 may send the modulated optical beam using an MRR included in the wireless device 515. In some examples, the wireless device 515 may refrain from modulating the optical beam or sending the modulated optical beam if all of the code blocks (e.g., code blocks whose feedback is to be sent via the optical beam) are decoded successfully. As one example, for single code block feedback, if the second code block is decoded successfully (e.g., decoded without error or ACK), the wireless device 515 may refrain from modulating the optical beam and sending the modulated optical beam including feedback associated with the second code block. Alternatively, if the second code block is not decoded successfully (e.g., an error is identifier with decoding the second code block or NACK), the wireless device 515 may modulate the optical beam and transmit the modulated optical beam including the feedback associated with the second code block. For aggregated code block feedback, the wireless device 515 may modulate the optical beam and transmit the modulated optical beam if one or both of the second code block or the third code block are decoded unsuccessfully (e.g., NACK).

In some examples, the modulated optical beam may additionally include a synchronization signal that has a sequence length (e.g., the sequence length indicated in the control signaling). Further, in some examples, the wireless device 515 may transmit the feedback according to a periodicity (e.g., the periodicity indicated in the control signaling) and as described in FIG. 3. Alternatively, the wireless device 515 may transmit feedback aperiodically as described in FIG. 4.

At 535, the wireless device 515 may potentially receive a retransmission of a code block of the set of code blocks. In some examples, the wireless device 515 may receive a retransmission of the first code block, the second code block, or the third code block if the feedback associated with the first code block, the second code block, or the third code block is NACK feedback.

Figure 6:
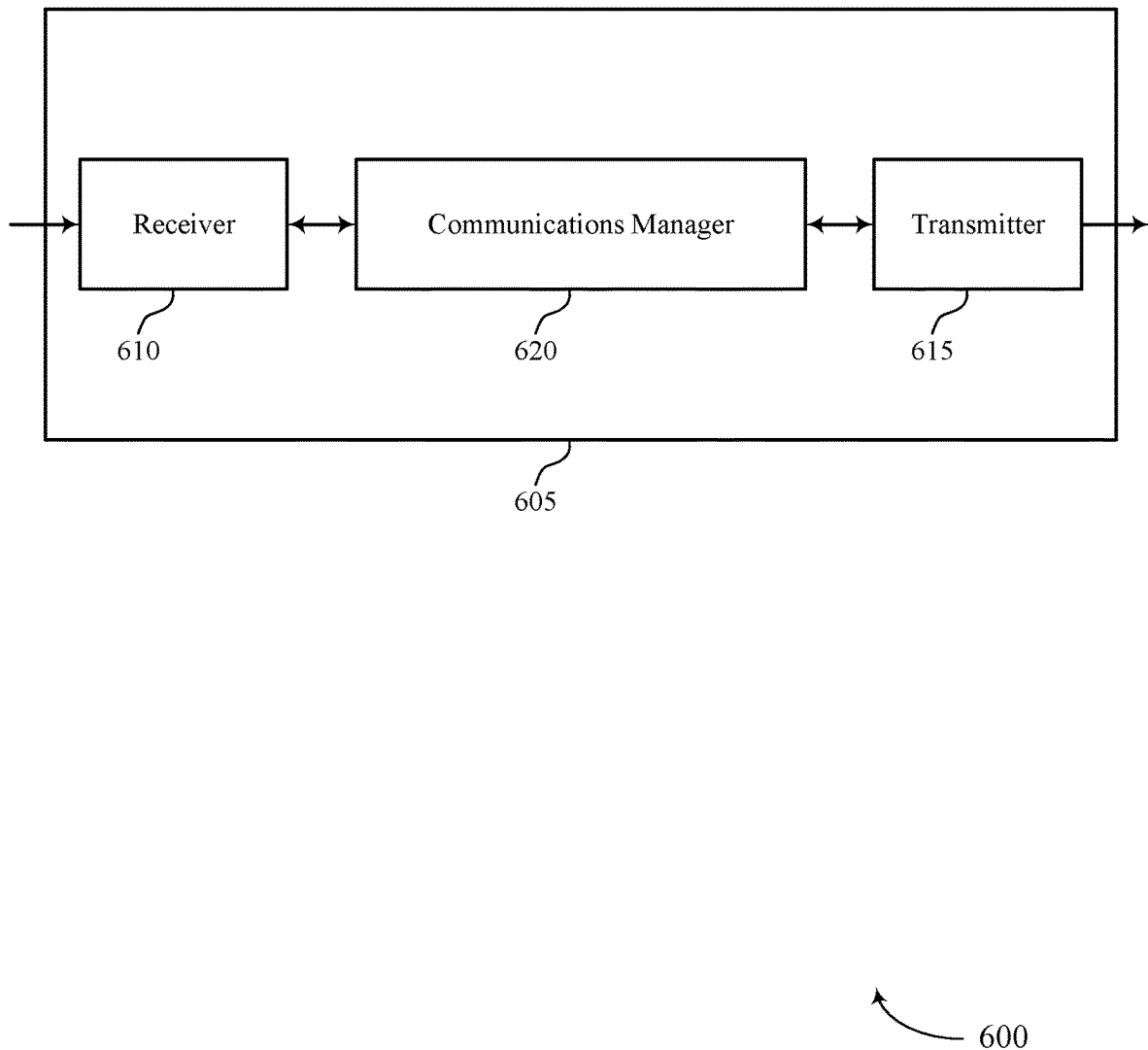
FIGS. 6 and 7 show block diagrams of devices that support feedback mechanism for a laser based OWC system in accordance with one or more aspects of the present disclosure.

FIG. 6 shows a block diagram 600 of a device 605 that supports feedback mechanism for a laser based OWC system in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to feedback mechanism for a laser based OWC system). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to feedback mechanism for a laser based OWC system). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of feedback mechanism for a laser based OWC system as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a wireless device in accordance with examples as disclosed herein. For example, the communications manager 620 may be configured as or otherwise support a means for monitoring a set of time resources for a set of multiple code blocks. The communications manager 620 may be configured as or otherwise support a means for receiving, from a network entity and based on monitoring for the set of multiple code blocks, a code block of the set of multiple code blocks via an optical beam. The communications manager 620 may be configured as or otherwise support a means for modulating the optical beam based on receiving the code block. The communications manager 620 may be configured as or otherwise support a means for sending, to the network entity, the modulated optical beam including feedback associated with at least one code block of the set of multiple code blocks.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced power consumption and more efficient utilization of communication resources.

Figure 7:
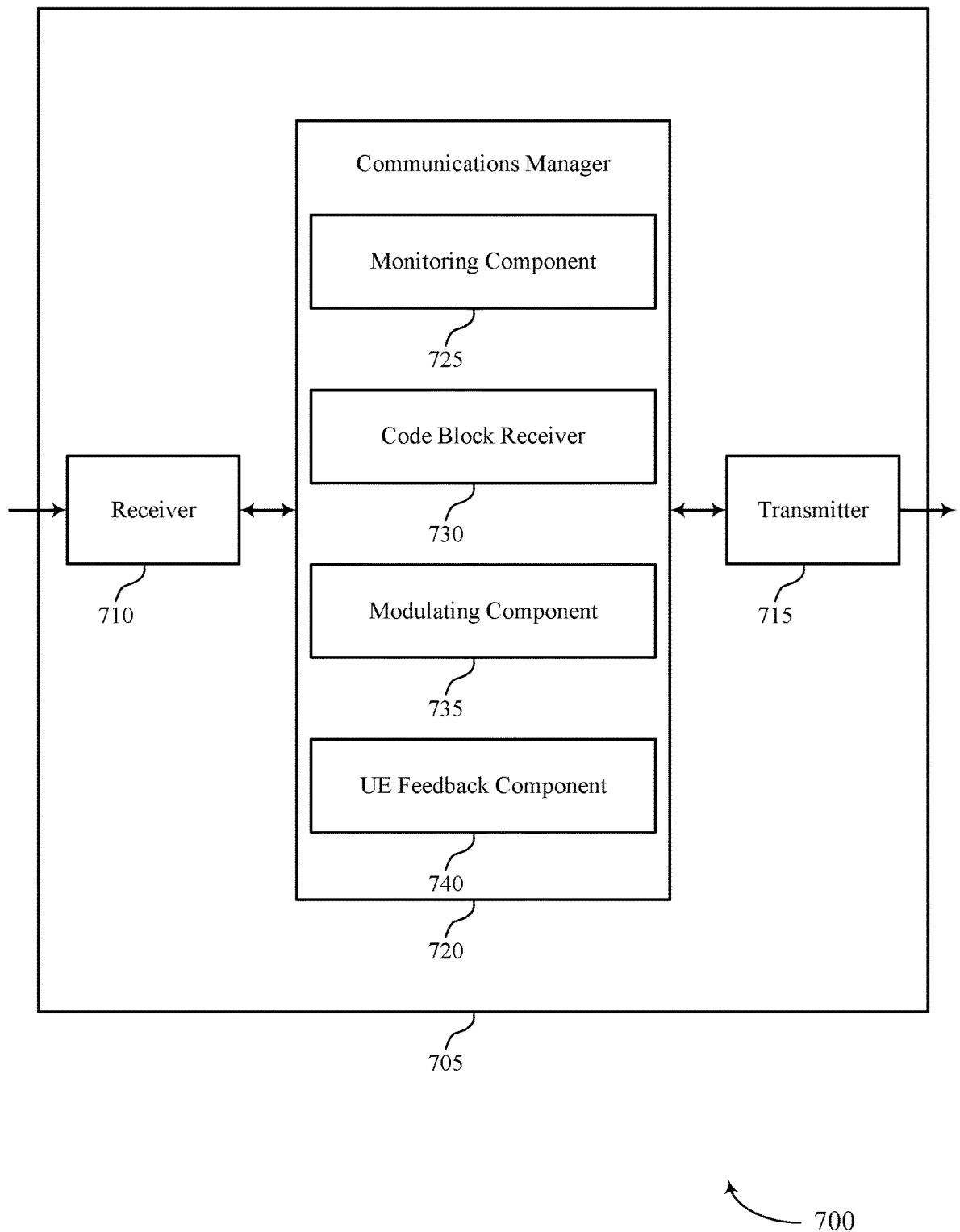

FIG. 7 shows a block diagram 700 of a device 705 that supports feedback mechanism for a laser based OWC system in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to feedback mechanism for a laser based OWC system). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to feedback mechanism for a laser based OWC system). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of feedback mechanism for a laser based OWC system as described herein. For example, the communications manager 720 may include a monitoring component 725, a code block receiver 730, a modulating component 735, a UE feedback component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a wireless device in accordance with examples as disclosed herein. The monitoring component 725 may be configured as or otherwise support a means for monitoring a set of time resources for a set of multiple code blocks. The code block receiver 730 may be configured as or otherwise support a means for receiving, from a network entity and based on monitoring for the set of multiple code blocks, a code block of the set of multiple code blocks via an optical beam. The modulating component 735 may be configured as or otherwise support a means for modulating the optical beam based on receiving the code block. The UE feedback component 740 may be configured as or otherwise support a means for sending, to the network entity, the modulated optical beam including feedback associated with at least one code block of the set of multiple code blocks.

Figure 8:
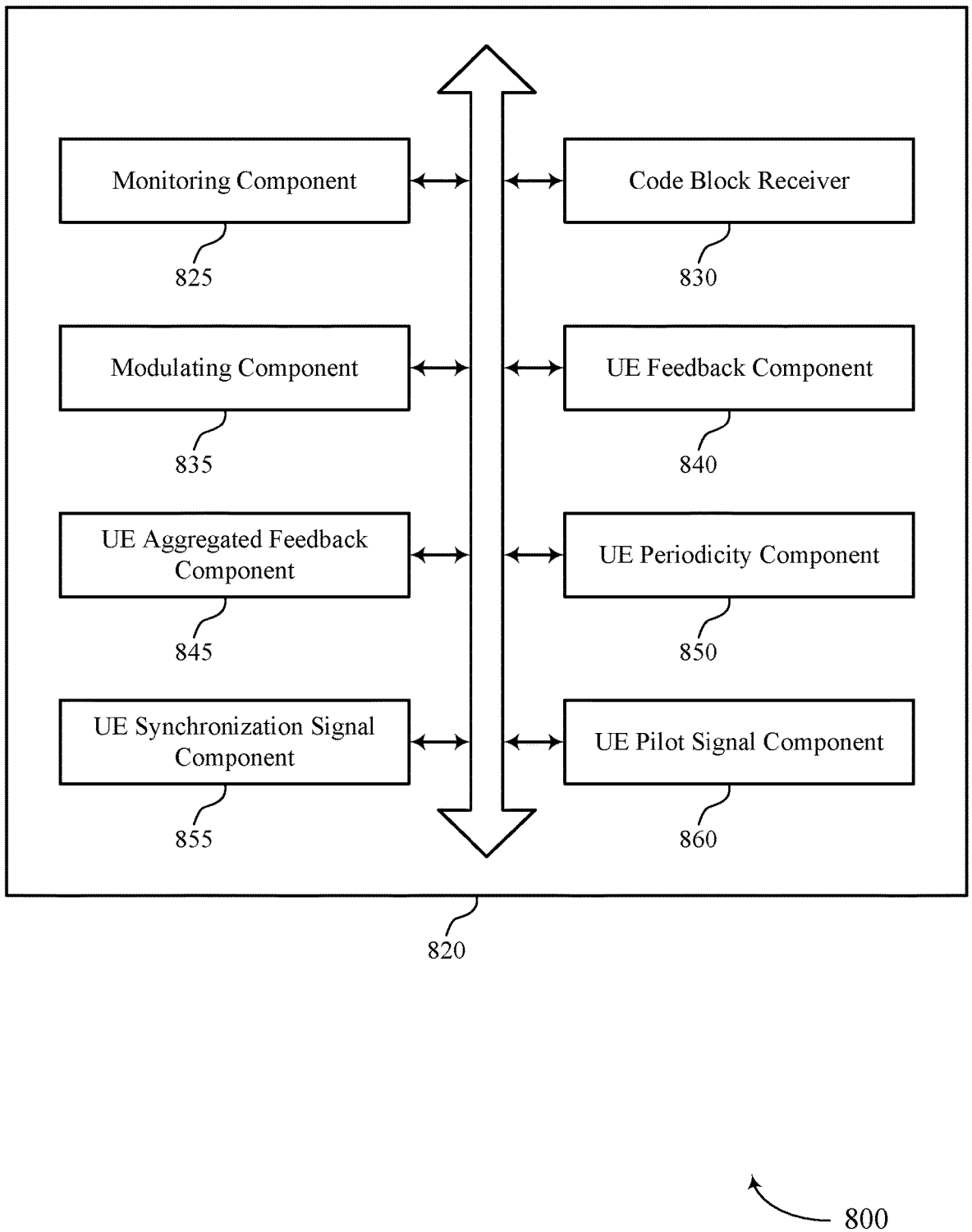
FIG. 8 shows a block diagram of a communications manager that supports feedback mechanism for a laser based OWC system in accordance with one or more aspects of the present disclosure.

FIG. 8 shows a block diagram 800 of a communications manager 820 that supports feedback mechanism for a laser based OWC system in accordance with one or more aspects of the present disclosure. The communications manager 820 may be an example of aspects of a communications manager 620, a communications manager 720, or both, as described herein. The communications manager 820, or various components thereof, may be an example of means for performing various aspects of feedback mechanism for a laser based OWC system as described herein. For example, the communications manager 820 may include a monitoring component 825, a code block receiver 830, a modulating component 835, a UE feedback component 840, a UE aggregated feedback component 845, a UE periodicity component 850, a UE synchronization signal component 855, a UE pilot signal component 860, or any combination thereof. Each of these components may communicate, directly or indirectly, with one another (e.g., via one or more buses).

The communications manager 820 may support wireless communication at a wireless device in accordance with examples as disclosed herein. The monitoring component 825 may be configured as or otherwise support a means for monitoring a set of time resources for a set of multiple code blocks. The code block receiver 830 may be configured as or otherwise support a means for receiving, from a network entity and based on monitoring for the set of multiple code blocks, a code block of the set of multiple code blocks via an optical beam. The modulating component 835 may be configured as or otherwise support a means for modulating the optical beam based on receiving the code block. The UE feedback component 840 may be configured as or otherwise support a means for sending, to the network entity, the modulated optical beam including feedback associated with at least one code block of the set of multiple code blocks.

In some examples, the UE aggregated feedback component 845 may be configured as or otherwise support a means for receiving control signaling indicating a threshold number of code blocks, where the feedback is based on the threshold number of code blocks.

In some examples, the UE periodicity component 850 may be configured as or otherwise support a means for receiving control signaling indicating a periodicity, where sending the modulated optical beam is based on the periodicity.

In some examples, the UE synchronization signal component 855 may be configured as or otherwise support a means for receiving control signaling indicating a sequence length of a synchronization signal, where sending the modulated optical beam is based on the sequence length.

In some examples, to support sending the modulated optical beam, the UE synchronization signal component 855 may be configured as or otherwise support a means for sending a synchronization signal, where the modulated optical beam includes the synchronization signal.

In some examples, the code block receiver 830 may be configured as or otherwise support a means for receiving, prior to receiving the code block, a second code block of the set of multiple code blocks via the optical beam, where the feedback is associated with the second code block.

In some examples, the UE feedback component 840 may be configured as or otherwise support a means for identifying an error associated with decoding the second code block, where transmitting the feedback is based on identifying the error. In some examples, the code block receiver 830 may be configured as or otherwise support a means for receiving, after receiving the code block, a retransmission of the second code block based on sending the modulated optical beam including the feedback associated with the second code block.

In some examples, the code block receiver 830 may be configured as or otherwise support a means for receiving, prior to receiving the second code block, a third code block of the set of multiple code blocks via the optical beam, where the feedback is associated with the second code block and the third code block.

In some examples, the UE feedback component 840 may be configured as or otherwise support a means for detecting an error associated with decoding one or both of the second code block or the third code block, where transmitting the feedback is based on detecting the error.

In some examples, the code block receiver 830 may be configured as or otherwise support a means for decoding the code block without error. In some examples, the code block receiver 830 may be configured as or otherwise support a means for receiving, after receiving the code block, a second code block via the optical beam. In some examples, the UE feedback component 840 may be configured as or otherwise support a means for refraining from sending a second modulated optical beam including feedback associated with the code block based on decoding the code block without error.

In some examples, the UE pilot signal component 860 may be configured as or otherwise support a means for receiving, from the network entity and after receiving the code block, a pilot signal via a second optical beam. In some examples, the modulating component 835 may be configured as or otherwise support a means for modulating the second optical beam based on receiving the pilot signal. In some examples, the UE feedback component 840 may be configured as or otherwise support a means for sending, to the network entity, the modulated second optical beam including feedback associated with the code block of the set of multiple code blocks. In some examples, the wireless device includes an MRR.

In some examples, the feedback associated with the at least one code block of the set of multiple code blocks includes ACK feedback or NACK feedback for the at least one code block of the set of multiple code blocks.

Figure 9:
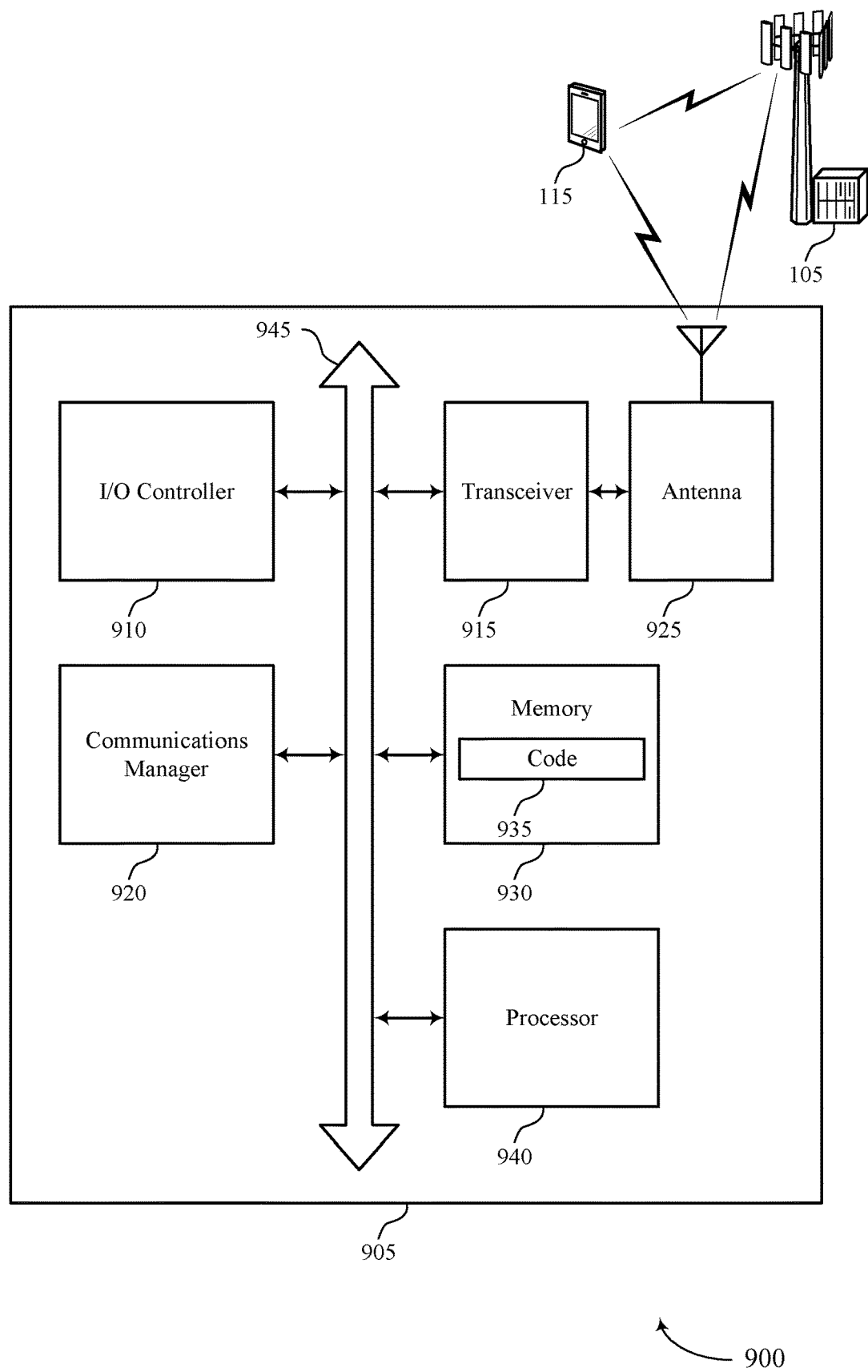
FIG. 9 shows a diagram of a system including a device that supports feedback mechanism for a laser based OWC system in accordance with one or more aspects of the present disclosure.

FIG. 9 shows a diagram of a system 900 including a device 905 that supports feedback mechanism for a laser based OWC system in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting feedback mechanism for a laser based OWC system). For example, the device 905 or a component of the device 905 may include a processor 940 and memory 930 coupled with or to the processor 940, the processor 940 and memory 930 configured to perform various functions described herein.

The communications manager 920 may support wireless communication at a wireless device in accordance with examples as disclosed herein. For example, the communications manager 920 may be configured as or otherwise support a means for monitoring a set of time resources for a set of multiple code blocks. The communications manager 920 may be configured as or otherwise support a means for receiving, from a network entity and based on monitoring for the set of multiple code blocks, a code block of the set of multiple code blocks via an optical beam. The communications manager 920 may be configured as or otherwise support a means for modulating the optical beam based on receiving the code block. The communications manager 920 may be configured as or otherwise support a means for sending, to the network entity, the modulated optical beam including feedback associated with at least one code block of the set of multiple code blocks.

By including or configuring the communications manager 920 in accordance with examples as described herein, the device 905 may support techniques for reduced latency, reduced power consumption, and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of feedback mechanism for a laser based OWC system as described herein, or the processor 940 and the memory 930 may be otherwise configured to perform or support such operations.

Figure 10:
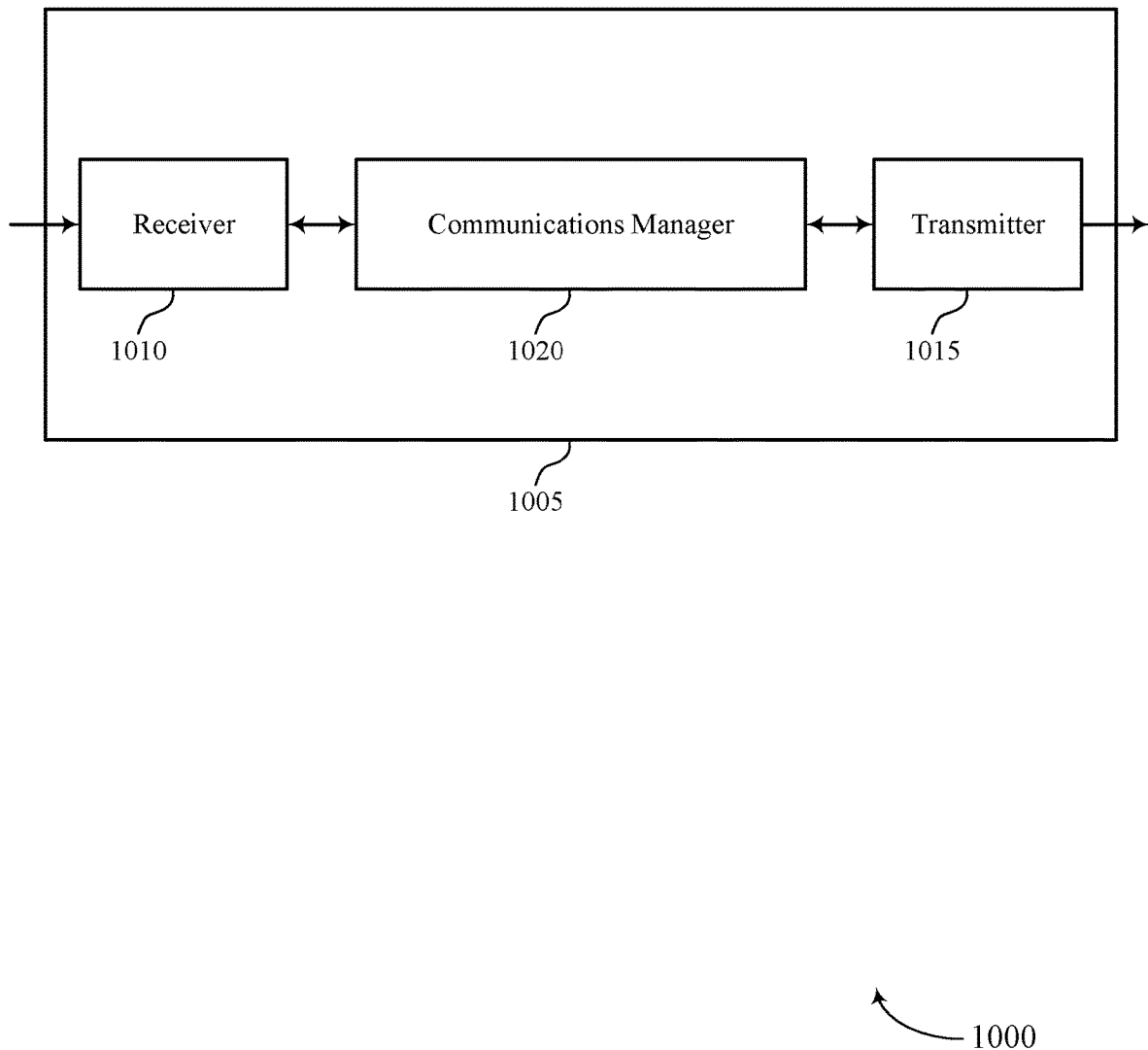
FIGS. 10 and 11 show block diagrams of devices that support feedback mechanism for a laser based OWC system in accordance with one or more aspects of the present disclosure.

FIG. 10 shows a block diagram 1000 of a device 1005 that supports feedback mechanism for a laser based OWC system in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas.

Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of feedback mechanism for a laser based OWC system as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting, via a set of time resources, a code block of a set of multiple code blocks via an optical beam. The communications manager 1020 may be configured as or otherwise support a means for receiving, based on transmitting the code block, a modulated optical beam including feedback associated with at least one code block of the set of multiple code blocks.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced power consumption and more efficient utilization of communication resources.

Figure 11:
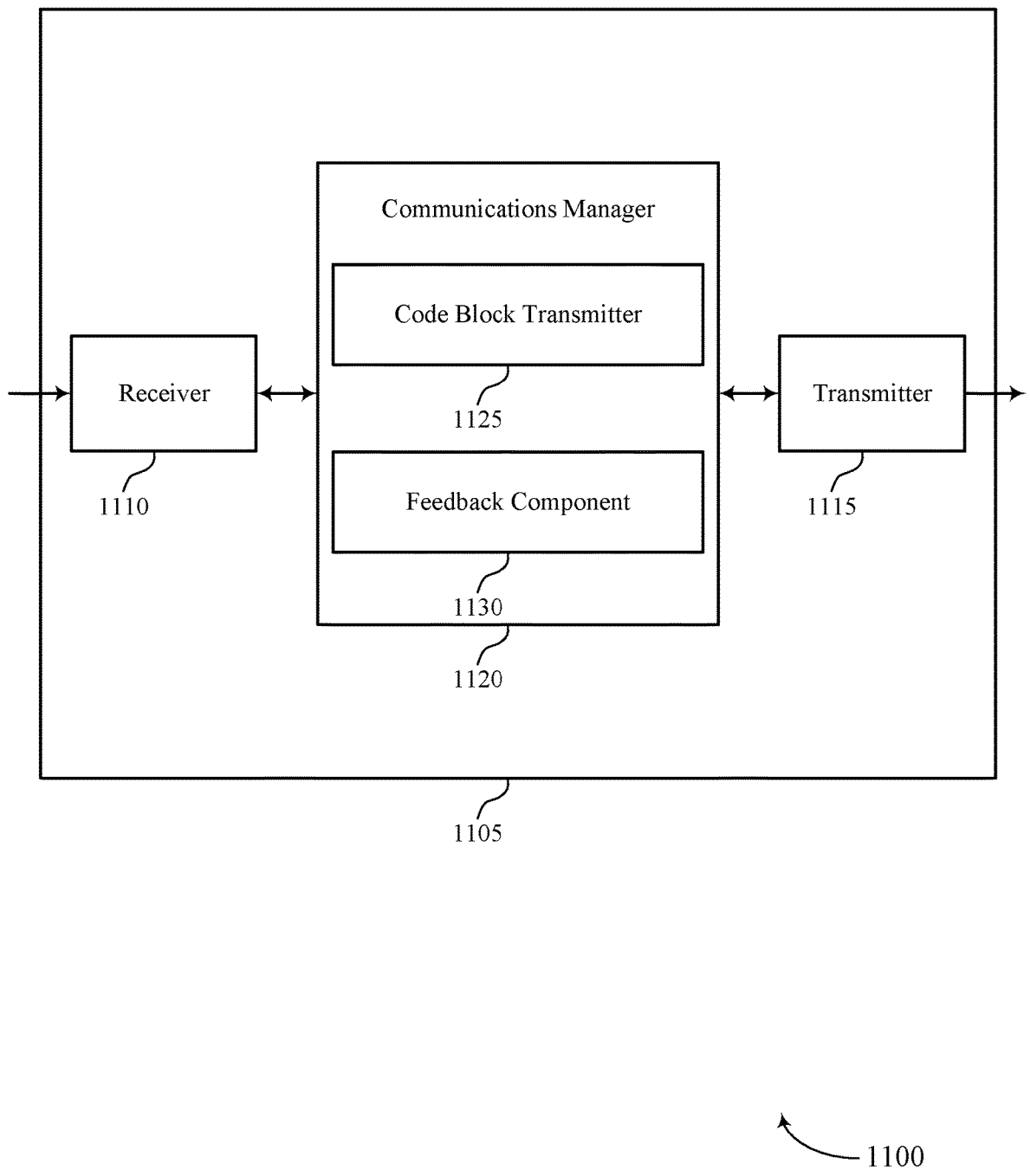

FIG. 11 shows a block diagram 1100 of a device 1105 that supports feedback mechanism for a laser based OWC system in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of feedback mechanism for a laser based OWC system as described herein. For example, the communications manager 1120 may include a code block transmitter 1125 a feedback component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The code block transmitter 1125 may be configured as or otherwise support a means for transmitting, via a set of time resources, a code block of a set of multiple code blocks via an optical beam. The feedback component 1130 may be configured as or otherwise support a means for receiving, based on transmitting the code block, a modulated optical beam including feedback associated with at least one code block of the set of multiple code blocks.

Figure 12:
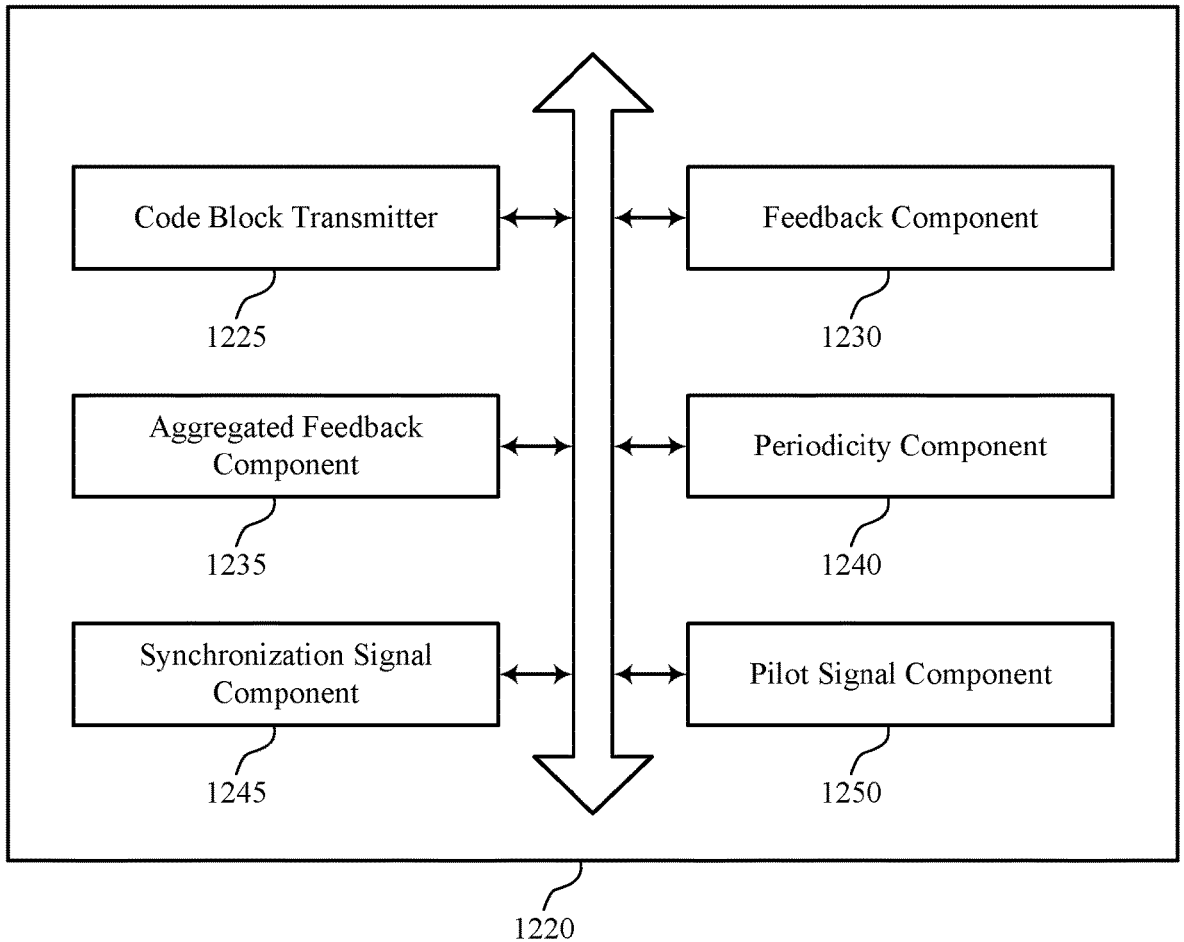
FIG. 12 shows a block diagram of a communications manager that supports feedback mechanism for a laser based OWC system in accordance with one or more aspects of the present disclosure.

FIG. 12 shows a block diagram 1200 of a communications manager 1220 that supports feedback mechanism for a laser based OWC system in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of feedback mechanism for a laser based OWC system as described herein. For example, the communications manager 1220 may include a code block transmitter 1225, a feedback component 1230, an aggregated feedback component 1235, a periodicity component 1240, a synchronization signal component 1245, a pilot signal component 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The code block transmitter 1225 may be configured as or otherwise support a means for transmitting, via a set of time resources, a code block of a set of multiple code blocks via an optical beam. The feedback component 1230 may be configured as or otherwise support a means for receiving, based on transmitting the code block, a modulated optical beam including feedback associated with at least one code block of the set of multiple code blocks.

In some examples, the aggregated feedback component 1235 may be configured as or otherwise support a means for transmitting control signaling indicating a threshold number of code blocks, where the feedback is based on the threshold number of code blocks.

In some examples, the periodicity component 1240 may be configured as or otherwise support a means for transmitting control signaling indicating a periodicity, where receiving the modulated optical beam is based on the periodicity.

In some examples, the synchronization signal component 1245 may be configured as or otherwise support a means for transmitting control signaling indicating a sequence length of a synchronization signal, where receiving the modulated optical beam is based on the sequence length.

In some examples, to support receiving the modulated optical beam, the synchronization signal component 1245 may be configured as or otherwise support a means for receiving a synchronization signal, where the modulated optical beam includes the synchronization signal.

In some examples, the code block transmitter 1225 may be configured as or otherwise support a means for transmitting, prior to transmitting the code block, a second code block of the set of multiple code blocks via the optical beam, where the feedback is associated with the second code block.

In some examples, the code block transmitter 1225 may be configured as or otherwise support a means for transmitting, prior to transmitting the second code block, a third code block of the set of multiple code blocks via the optical beam, where the feedback is associated with the second code block.

In some examples, the pilot signal component 1250 may be configured as or otherwise support a means for transmitting, after transmitting the code block, a pilot signal via a second optical beam. In some examples, the feedback component 1230 may be configured as or otherwise support a means for receiving a modulated second optical beam including feedback associated with the code block of the set of multiple code blocks.

In some examples, the feedback associated with the at least one code block of the set of multiple code blocks includes ACK feedback or NACK feedback for the at least one code block of the set of multiple code blocks.

Figure 13:
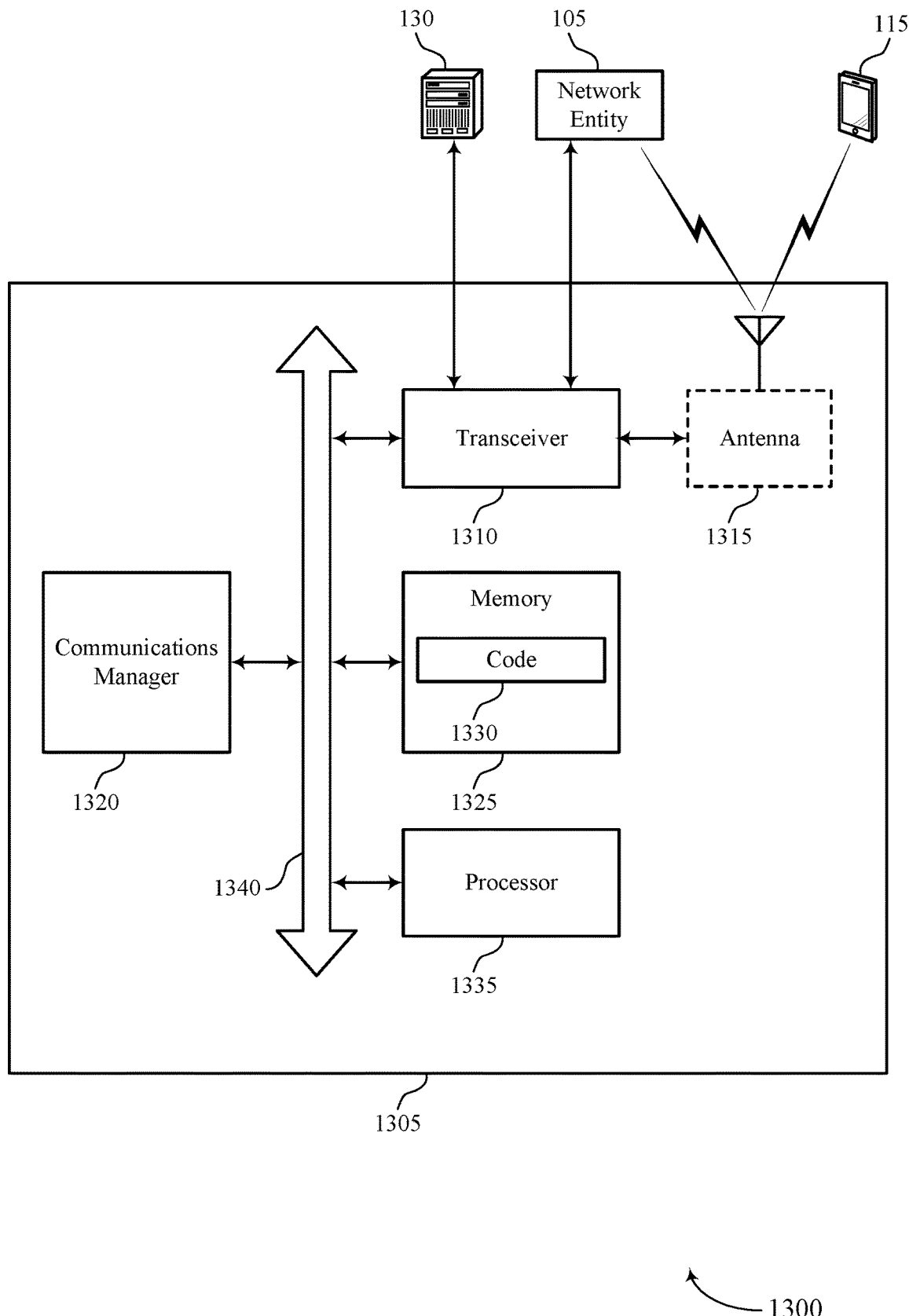
FIG. 13 shows a diagram of a system including a device that supports feedback mechanism for a laser based OWC system in accordance with one or more aspects of the present disclosure.

FIG. 13 shows a diagram of a system 1300 including a device 1305 that supports feedback mechanism for a laser based OWC system in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting feedback mechanism for a laser based OWC system). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting, via a set of time resources, a code block of a set of multiple code blocks via an optical beam. The communications manager 1320 may be configured as or otherwise support a means for receiving, based on transmitting the code block, a modulated optical beam including feedback associated with at least one code block of the set of multiple code blocks.

By including or configuring the communications manager 1320 in accordance with examples as described herein, the device 1305 may support techniques for reduced latency, reduced power consumption, and more efficient utilization of communication resources.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of feedback mechanism for a laser based OWC system as described herein, or the processor 1335 and the memory 1325 may be otherwise configured to perform or support such operations.

Figure 14:
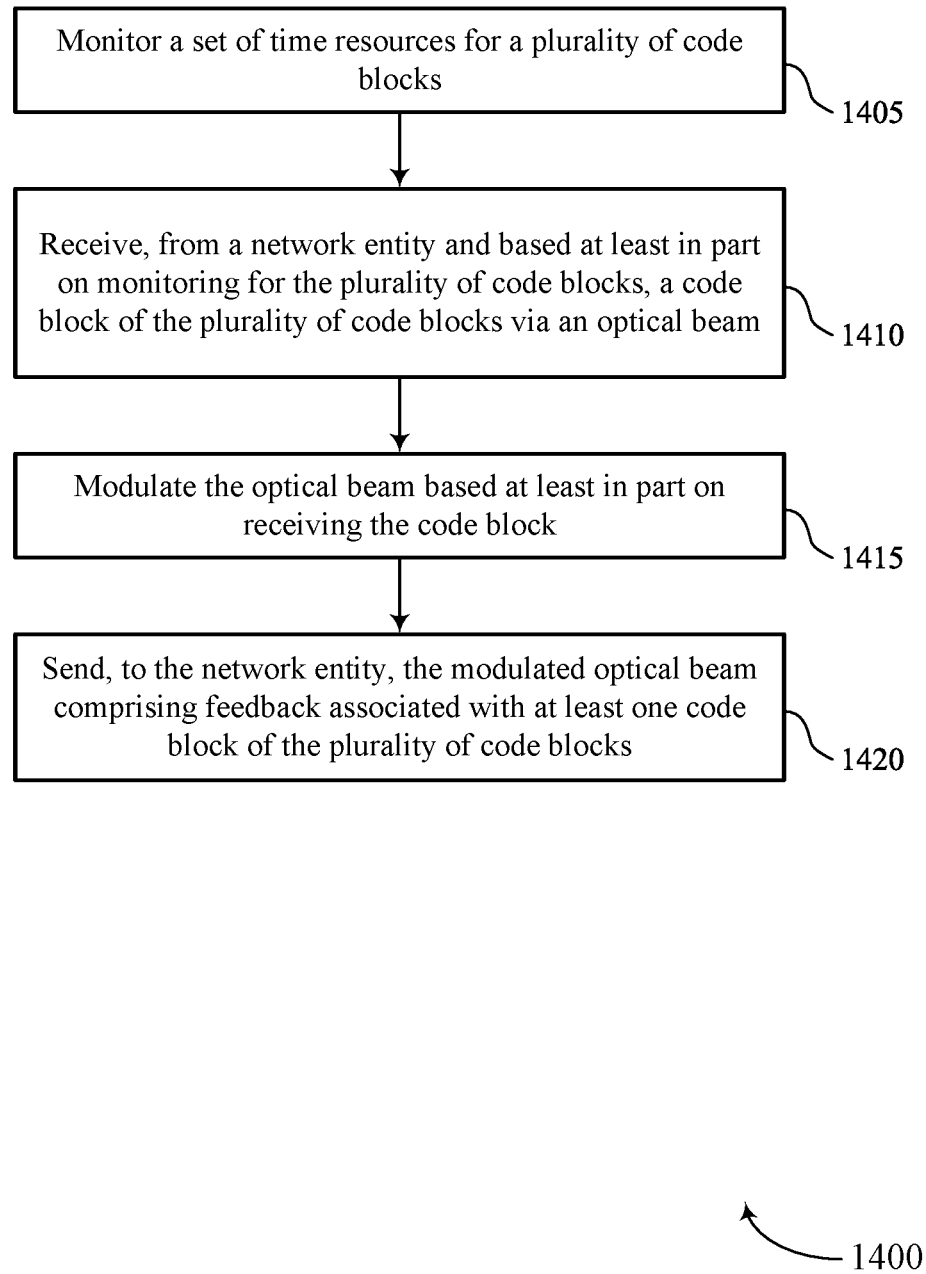
FIGS. 14 through 17 show flowcharts illustrating methods that support feedback mechanism for a laser based OWC system in accordance with one or more aspects of the present disclosure.

FIG. 14 shows a flowchart illustrating a method 1400 that supports feedback mechanism for a laser based OWC system in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include monitoring a set of time resources for a set of multiple code blocks. The operations of 1405 may be performed in accordance with examples as disclosed herein. In some examples, aspects of the operations of 1405 may be performed by a monitoring component 825 as described with reference to FIG. 8.

At 1410, the method may include receiving, from a network entity and based on monitoring for the set of multiple code blocks, a code block of the set of multiple code blocks via an optical beam. The operations of 1410 may be performed in accordance with examples as disclosed herein. In some examples, aspects of the operations of 1410 may be performed by a code block receiver 830 as described with reference to FIG. 8.

At 1415, the method may include modulating the optical beam based on receiving the code block. The operations of 1415 may be performed in accordance with examples as disclosed herein. In some examples, aspects of the operations of 1415 may be performed by a modulating component 835 as described with reference to FIG. 8.

At 1420, the method may include sending, to the network entity, the modulated optical beam including feedback associated with at least one code block of the set of multiple code blocks. The operations of 1420 may be performed in accordance with examples as disclosed herein. In some examples, aspects of the operations of 1420 may be performed by a UE feedback component 840 as described with reference to FIG. 8.

Figure 15:
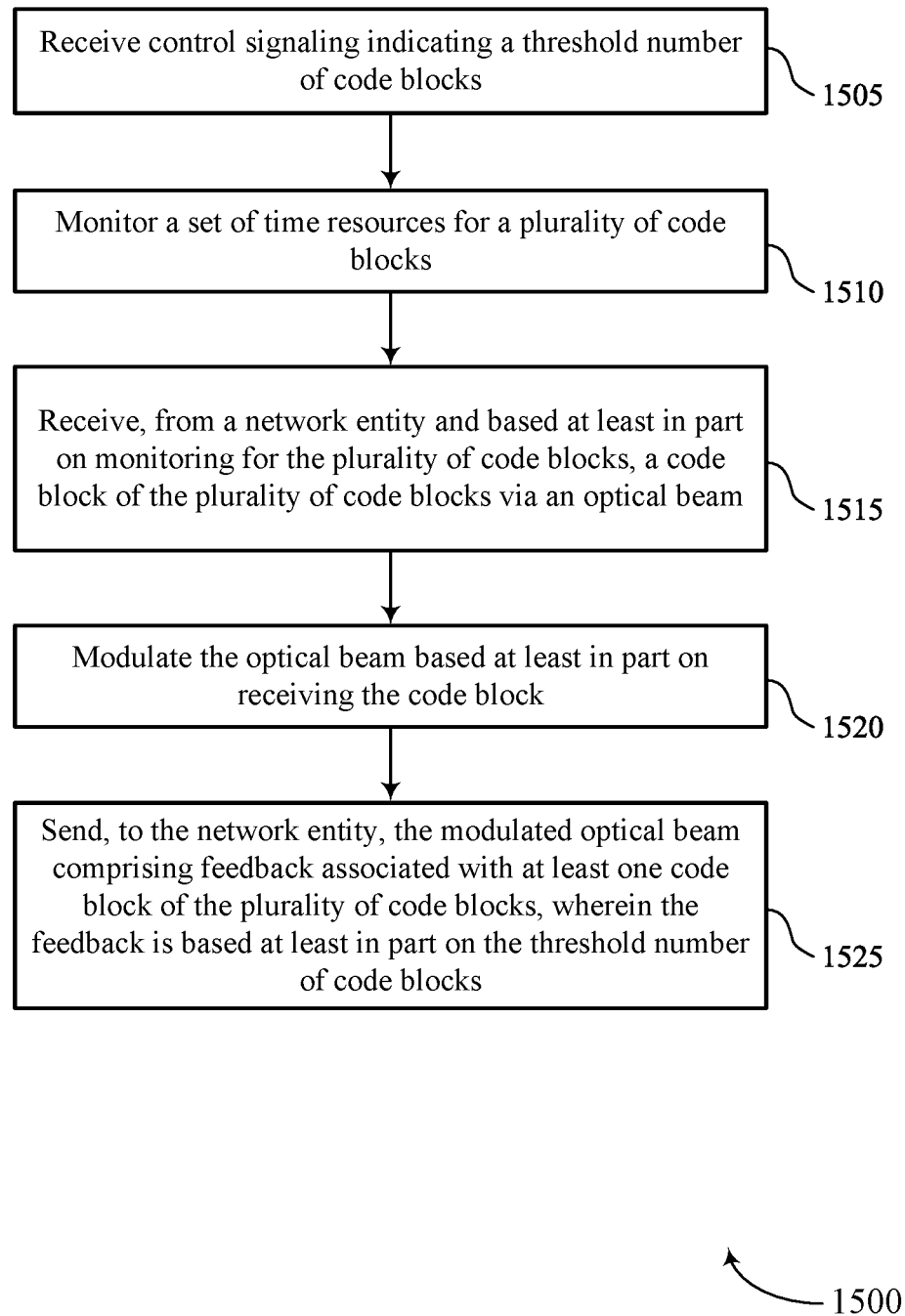

FIG. 15 shows a flowchart illustrating a method 1500 that supports feedback mechanism for a laser based OWC system in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving control signaling indicating a threshold number of code blocks. The operations of 1505 may be performed in accordance with examples as disclosed herein. In some examples, aspects of the operations of 1505 may be performed by a UE aggregated feedback component 845 as described with reference to FIG. 8.

At 1510, the method may include monitoring a set of time resources for a set of multiple code blocks. The operations of 1510 may be performed in accordance with examples as disclosed herein. In some examples, aspects of the operations of 1510 may be performed by a monitoring component 825 as described with reference to FIG. 8.

At 1515, the method may include receiving, from a network entity and based on monitoring for the set of multiple code blocks, a code block of the set of multiple code blocks via an optical beam. The operations of 1515 may be performed in accordance with examples as disclosed herein. In some examples, aspects of the operations of 1515 may be performed by a code block receiver 830 as described with reference to FIG. 8.

At 1520, the method may include modulating the optical beam based on receiving the code block. The operations of 1520 may be performed in accordance with examples as disclosed herein. In some examples, aspects of the operations of 1520 may be performed by a modulating component 835 as described with reference to FIG. 8.

At 1525, the method may include sending, to the network entity, the modulated optical beam including feedback associated with at least one code block of the set of multiple code blocks, where the feedback is based on the threshold number of code blocks. The operations of 1525 may be performed in accordance with examples as disclosed herein. In some examples, aspects of the operations of 1525 may be performed by a UE feedback component 840 as described with reference to FIG. 8.

Figure 16:
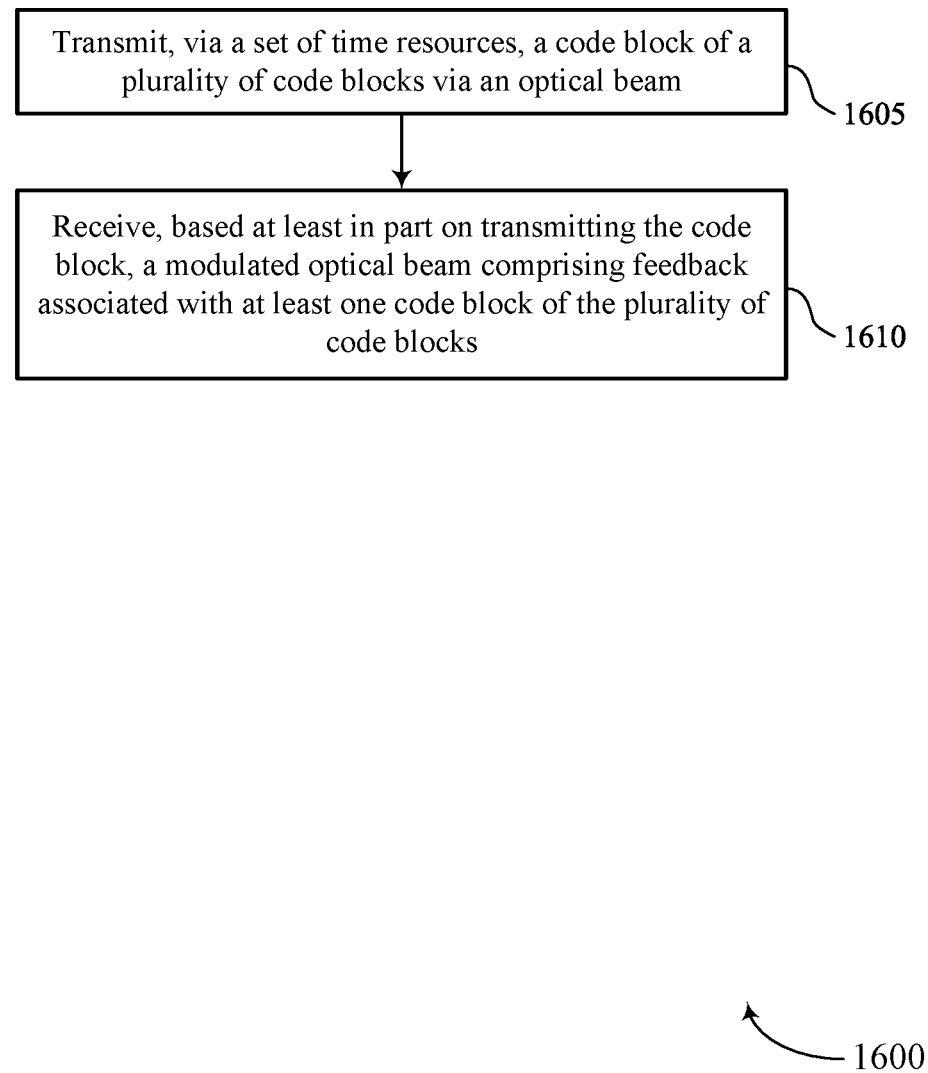

FIG. 16 shows a flowchart illustrating a method 1600 that supports feedback mechanism for a laser based OWC system in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, via a set of time resources, a code block of a set of multiple code blocks via an optical beam. The operations of 1605 may be performed in accordance with examples as disclosed herein. In some examples, aspects of the operations of 1605 may be performed by a code block transmitter 1225 as described with reference to FIG. 12.

At 1610, the method may include receiving, based on transmitting the code block, a modulated optical beam including feedback associated with at least one code block of the set of multiple code blocks. The operations of 1610 may be performed in accordance with examples as disclosed herein. In some examples, aspects of the operations of 1610 may be performed by a feedback component 1230 as described with reference to FIG. 12.

Figure 17:
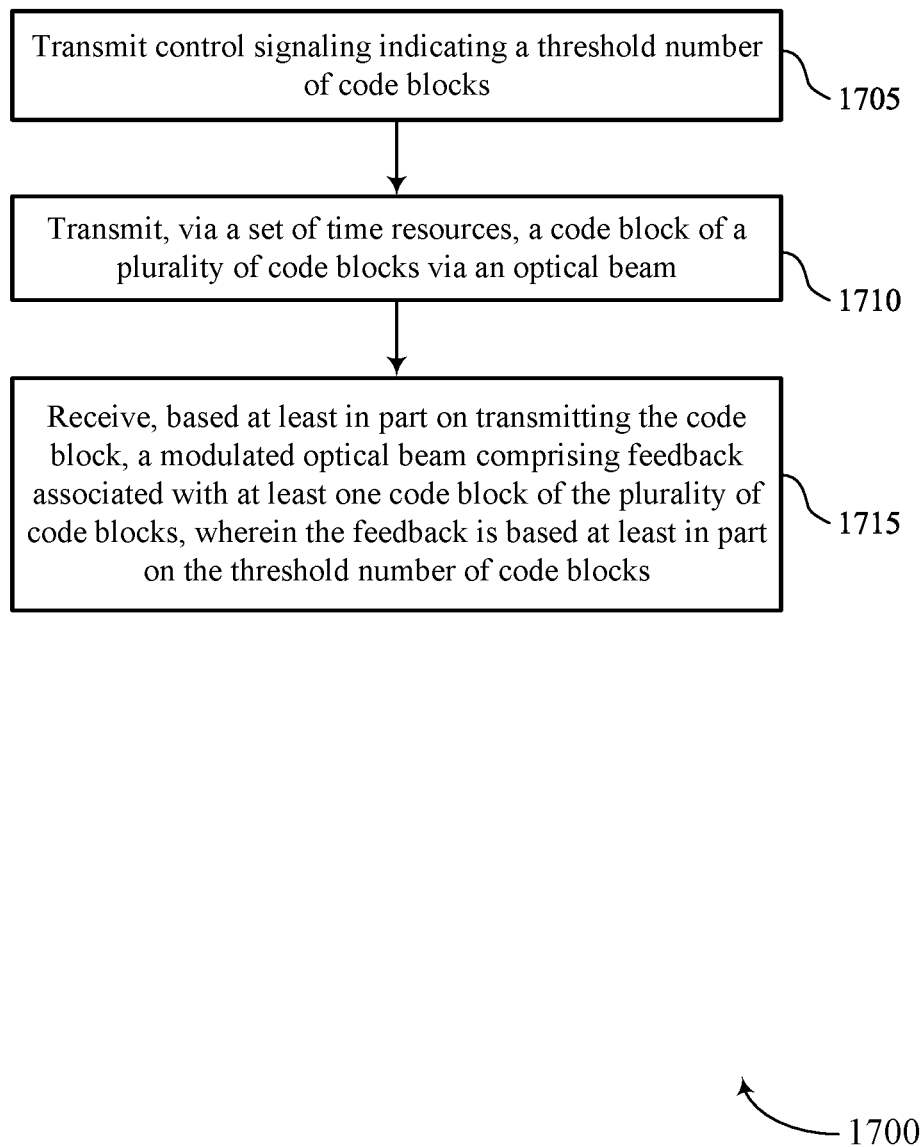

FIG. 17 shows a flowchart illustrating a method 1700 that supports feedback mechanism for a laser based OWC system in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting control signaling indicating a threshold number of code blocks. The operations of 1705 may be performed in accordance with examples as disclosed herein. In some examples, aspects of the operations of 1705 may be performed by an aggregated feedback component 1235 as described with reference to FIG. 12.

At 1710, the method may include transmitting, via a set of time resources, a code block of a set of multiple code blocks via an optical beam. The operations of 1710 may be performed in accordance with examples as disclosed herein. In some examples, aspects of the operations of 1710 may be performed by a code block transmitter 1225 as described with reference to FIG. 12.

At 1715, the method may include receiving, based on transmitting the code block, a modulated optical beam including feedback associated with at least one code block of the set of multiple code blocks, where the feedback is based on the threshold number of code blocks. The operations of 1715 may be performed in accordance with examples as disclosed herein. In some examples, aspects of the operations of 1715 may be performed by a feedback component 1230 as described with reference to FIG. 12.

The following provides an overview of aspects of the present disclosure:

Aspect 1: A method for wireless communication at a wireless device, comprising: monitoring a set of time resources for a plurality of code blocks; receiving, from a network entity and based at least in part on monitoring for the plurality of code blocks, a code block of the plurality of code blocks via an optical beam; modulating the optical beam based at least in part on receiving the code block; and sending, to the network entity, the modulated optical beam comprising feedback associated with at least one code block of the plurality of code blocks.

Aspect 2: The method of aspect 1, further comprising: receiving control signaling indicating a threshold number of code blocks, wherein the feedback is based at least in part on the threshold number of code blocks.

Aspect 3: The method of any of aspects 1 through 2, further comprising: receiving control signaling indicating a periodicity, wherein sending the modulated optical beam is based at least in part on the periodicity.

Aspect 4: The method of any of aspects 1 through 3, further comprising: receiving control signaling indicating a sequence length of a synchronization signal, wherein sending the modulated optical beam is based at least in part on the sequence length.

Aspect 5: The method of any of aspects 1 through 4, wherein sending the modulated optical beam comprises: sending a synchronization signal, wherein the modulated optical beam comprises the synchronization signal.

Aspect 6: The method of any of aspects 1 through 5, further comprising: receiving, prior to receiving the code block, a second code block of the plurality of code blocks via the optical beam, wherein the feedback is associated with the second code block.

Aspect 7: The method of aspect 6, further comprising: identifying an error associated with decoding the second code block, wherein transmitting the feedback is based at least in part on identifying the error; and receiving, after receiving the code block, a retransmission of the second code block based at least in part on sending the modulated optical beam comprising the feedback associated with the second code block.

Aspect 8: The method of any of aspects 6 through 7, further comprising: receiving, prior to receiving the second code block, a third code block of the plurality of code blocks via the optical beam, wherein the feedback is associated with the second code block and the third code block.

Aspect 9: The method of aspect 8, further comprising: detecting an error associated with decoding one or both of the second code block or the third code block, wherein transmitting the feedback is based at least in part on detecting the error.

Aspect 10: The method of any of aspects 1 through 9, further comprising: decoding the code block without error; receiving, after receiving the code block, a second code block via the optical beam; and refraining from sending a second modulated optical beam comprising feedback associated with the code block based at least in part on decoding the code block without error.

Aspect 11: The method of any of aspects 1 through 10, further comprising: receiving, from the network entity and after receiving the code block, a pilot signal via a second optical beam; modulating the second optical beam based at least in part on receiving the pilot signal; and sending, to the network entity, the modulated second optical beam comprising feedback associated with the code block of the plurality of code blocks.

Aspect 12: The method of any of aspects 1 through 11, wherein the wireless device comprises an MRR.

Aspect 13: The method of any of aspects 1 through 12, wherein the feedback associated with the at least one code block of the plurality of code blocks comprises ACK feedback or NACK feedback for the at least one code block of the plurality of code blocks.

Aspect 14: A method for wireless communication at a network entity, comprising: transmitting, via a set of time resources, a code block of a plurality of code blocks via an optical beam; and receiving, based at least in part on transmitting the code block, a modulated optical beam comprising feedback associated with at least one code block of the plurality of code blocks.

Aspect 15: The method of aspect 14, further comprising: transmitting control signaling indicating a threshold number of code blocks, wherein the feedback is based at least in part on the threshold number of code blocks.

Aspect 16: The method of any of aspects 14 through 15, further comprising: transmitting control signaling indicating a periodicity, wherein receiving the modulated optical beam is based at least in part on the periodicity.

Aspect 17: The method of any of aspects 14 through 16, further comprising: transmitting control signaling indicating a sequence length of a synchronization signal, wherein receiving the modulated optical beam is based at least in part on the sequence length.

Aspect 18: The method of any of aspects 14 through 17, wherein receiving the modulated optical beam comprises: receiving a synchronization signal, wherein the modulated optical beam comprises the synchronization signal.

Aspect 19: The method of any of aspects 14 through 18, further comprising: transmitting, prior to transmitting the code block, a second code block of the plurality of code blocks via the optical beam, wherein the feedback is associated with the second code block.

Aspect 20: The method of aspect 19, further comprising: transmitting, prior to transmitting the second code block, a third code block of the plurality of code blocks via the optical beam, wherein the feedback is associated with the second code block.

Aspect 21: The method of any of aspects 14 through 20, further comprising: transmitting, after transmitting the code block, a pilot signal via a second optical beam; and receiving a modulated second optical beam comprising feedback associated with the code block of the plurality of code blocks.

Aspect 22: The method of any of aspects 14 through 21, wherein the feedback associated with the at least one code block of the plurality of code blocks comprises ACK feedback or NACK feedback for the at least one code block of the plurality of code blocks.

Aspect 23: An apparatus for wireless communication at a wireless device, comprising a processor; memory coupled with the processor; and instructions stored in the memory and executable by the processor to cause the apparatus to perform a method of any of aspects 1 through 13.

Aspect 24: An apparatus for wireless communication at a wireless device, comprising at least one means for performing a method of any of aspects 1 through 13.

Aspect 25: A non-transitory computer-readable medium storing code for wireless communication at a wireless device, the code comprising instructions executable by a processor to perform a method of any of aspects 1 through 13.

Aspect 26: An apparatus for wireless communication at a network entity, comprising a processor; memory coupled with the processor; and instructions stored in the memory and executable by the processor to cause the apparatus to perform a method of any of aspects 14 through 22.

Aspect 27: An apparatus for wireless communication at a network entity, comprising at least one means for performing a method of any of aspects 14 through 22.

Aspect 28: A non-transitory computer-readable medium storing code for wireless communication at a network entity, the code comprising instructions executable by a processor to perform a method of any of aspects 14 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a wireless device, comprising:
   receiving control signaling indicating a periodicity associated with a plurality of feedback opportunities;
   monitoring a set of time resources for a plurality of code blocks;
   receiving, from a network entity and based at least in part on monitoring for the plurality of code blocks, a code block of the plurality of code blocks via an optical beam;
   modulating the optical beam based at least in part on receiving the code block;
   sending, to the network entity, the modulated optical beam during a feedback opportunity of the plurality of feedback opportunities in accordance with the periodicity, the modulated optical beam comprising feedback that indicates at least one code block of the plurality of code blocks was unsuccessfully received or decoded at the wireless device; and
   receiving a retransmission of the at least one code block based at least in part on sending the modulated optical beam comprising the feedback.

2. The method of claim 1, further comprising:
   receiving, via the control signaling, an indication of a threshold number of code blocks, wherein the feedback is based at least in part on the threshold number of code blocks.

3. The method of claim 1, further comprising:
   receiving, via the control signaling, an indication of a sequence length of a synchronization signal, wherein sending the modulated optical beam is based at least in part on the sequence length.

4. The method of claim 1, wherein sending the modulated optical beam comprises:
   sending a synchronization signal, wherein the modulated optical beam comprises the synchronization signal.

5. The method of claim 1, further comprising:
   receiving, prior to receiving the code block, a second code block of the plurality of code blocks via the optical beam, wherein the feedback is associated with the second code block.

6. The method of claim 5, further comprising:
   detecting an error associated with decoding the second code block, wherein transmitting the feedback is based at least in part on detecting the error, wherein receiving the retransmission of the at least one code block comprises:
   receiving, after receiving the code block, a retransmission of the second code block based at least in part on sending the modulated optical beam comprising the feedback associated with the second code block.

7. The method of claim 5, further comprising:
   receiving, prior to receiving the second code block, a third code block of the plurality of code blocks via the optical beam, wherein the feedback is associated with the second code block and the third code block.

8. The method of claim 7, further comprising:
   detecting an error associated with decoding one or both of the second code block or the third code block, wherein transmitting the feedback is based at least in part on detecting the error.

9. The method of claim 1, further comprising:
   decoding the code block without error;
   receiving, after receiving the code block, a second code block via the optical beam; and
   refraining from sending a second modulated optical beam comprising feedback associated with the code block based at least in part on decoding the code block without error.

10. The method of claim 1, further comprising:
receiving, from the network entity and after receiving the code block, a pilot signal via a second optical beam;
modulating the second optical beam based at least in part on receiving the pilot signal; and
sending, to the network entity, the modulated second optical beam comprising feedback associated with the code block of the plurality of code blocks.

11. The method of claim 1, wherein the wireless device comprises a modulated retro reflector.

12. The method of claim 1, wherein the feedback comprises negative acknowledgement feedback.

13. A method for wireless communication at a network entity, comprising:
transmitting control signaling indicating a periodicity associated with a plurality of feedback opportunities;
transmitting, via a set of time resources, a code block of a plurality of code blocks via an optical beam;
receiving, based at least in part on transmitting the code block, the optical beam during a feedback opportunity of the plurality of feedback opportunities in accordance with the periodicity, the optical beam modulated to comprise feedback that indicates that at least one code block of the plurality of code blocks was unsuccessfully decoded or received at a wireless device; and
transmitting a retransmission of the at least one code block based at least in part on receiving the optical beam comprising the feedback.

14. The method of claim 13, further comprising:
transmitting, via the control signaling, an indication of a threshold number of code blocks, wherein the feedback is based at least in part on the threshold number of code blocks.

15. The method of claim 13, further comprising:
transmitting, via the control signaling, an indication of a sequence length of a synchronization signal, wherein receiving the optical beam is based at least in part on the sequence length.

16. The method of claim 13, wherein receiving the optical beam comprises:
receiving a synchronization signal, wherein the optical beam comprises the synchronization signal.

17. The method of claim 13, further comprising:
transmitting, prior to transmitting the code block, a second code block of the plurality of code blocks via the optical beam, wherein the feedback is associated with the second code block.

18. The method of claim 17, further comprising:
transmitting, prior to transmitting the second code block, a third code block of the plurality of code blocks via the optical beam, wherein the feedback is associated with the second code block.

19. The method of claim 13, further comprising:
transmitting, after transmitting the code block, a pilot signal via a second optical beam; and
receiving the second optical beam, the second optical beam modulated to comprise feedback associated with the code block of the plurality of code blocks.

20. The method of claim 13, wherein the feedback comprises negative acknowledgement feedback.

21. An apparatus for wireless communication at a wireless device, comprising:
a processor;
memory coupled with the processor; and
instructions stored in the memory and executable by the processor to cause the apparatus to:
receive control signaling indicating a periodicity associated with a plurality of feedback opportunities;
monitor a set of time resources for a plurality of code blocks;
receive, from a network entity and based at least in part on monitoring for the plurality of code blocks, a code block of the plurality of code blocks via an optical beam;
modulate the optical beam based at least in part on receiving the code block;
send, to the network entity, the modulated optical beam during a feedback opportunity of the plurality of feedback opportunities in accordance with the periodicity, the modulated optical beam comprising feedback that indicates at least one code block of the plurality of code blocks was unsuccessfully received or decoded at the wireless device; and
receive a retransmission of the at least one code block based at least in part on sending the modulated optical beam comprising the feedback.

22. The apparatus of claim 21, wherein the instructions are further executable by the processor to cause the apparatus to:
receive control signaling indicating a threshold number of code blocks, wherein the feedback is based at least in part on the threshold number of code blocks.

23. The apparatus of claim 21, wherein the instructions are further executable by the processor to cause the apparatus to:
receive control signaling indicating a sequence length of a synchronization signal, wherein the modulated optical beam is sent based at least in part on the sequence length.

24. An apparatus for wireless communication at a network entity, comprising:
a processor;
memory coupled with the processor; and
instructions stored in the memory and executable by the processor to cause the apparatus to:
transmit control signaling indicating a periodicity associated with a plurality of feedback opportunities;
transmit, via a set of time resources, a code block of a plurality of code blocks via an optical beam;
receive, based at least in part on transmitting the code block, the optical beam during a feedback opportunity of the plurality of feedback opportunities in accordance with the periodicity, the optical beam modulated to comprise feedback that indicates that at least one code block of the plurality of code blocks was received and decoded at a wireless device; and
transmit a retransmission of the at least one code block based at least in part on receiving the optical beam comprising the feedback.

25. The apparatus of claim 24, wherein the instructions are further executable by the processor to cause the apparatus to:
transmit control signaling indicating a threshold number of code blocks, wherein the feedback is based at least in part on the threshold number of code blocks.

26. The apparatus of claim 24, wherein the instructions are further executable by the processor to cause the apparatus to:
transmit control signaling indicating a sequence length of a synchronization signal, wherein the optical beam is modulated based at least in part on the sequence length.

* * * * *